US012725118B2

(12) United States Patent
R et al.

(10) Patent No.: US 12,725,118 B2
(45) **Date of Patent: *Sep. 1, 2026**

(54) DOMAIN-AWARE DECOMPOSITION FOR SUPPLY CHAIN MASTER PLANNING USING LINEAR PROGRAMMING

(71) Applicant: Blue Yonder Group, Inc., Scottsdale, AZ (US)

(72) Inventors: Devanand R, Bangalore (IN); Narayan Nandeda, Ujjain (IN); Tushar Shekhar, Bangalore (IN)

(73) Assignee: Blue Yonder Group, Inc., Scottsdale, AZ (US)

(*) Notice: Subject to any disclaimer, the term of this patent is extended or adjusted under 35 U.S.C. 154(b) by 115 days.

This patent is subject to a terminal disclaimer.

(21) Appl. No.: 18/824,690

(22) Filed: Sep. 4, 2024

(65) Prior Publication Data

US 2024/0428187 A1 Dec. 26, 2024

Related U.S. Application Data

(63) Continuation of application No. 18/543,678, filed on Dec. 18, 2023, now Pat. No. 12,112,295, which is a continuation of application No. 17/896,757, filed on Aug. 26, 2022, now Pat. No. 11,893,531, which is a (Continued)

(51) Int. Cl.
*G06Q 10/087* (2023.01)
*G06F 17/12* (2006.01)
(Continued)

(52) U.S. Cl.
CPC ........... *G06Q 10/087* (2013.01); *G06F 17/12* (2013.01); *G06F 17/13* (2013.01); *G06Q 10/04* (2013.01)

(58) Field of Classification Search
CPC ...... G06Q 10/087; G06Q 10/04; G06F 17/12; G06F 17/13; G06F 17/11
(Continued)

(56) References Cited

U.S. PATENT DOCUMENTS 5,953,707 A 9/1999 Huang et al.
7,499,766 B2 3/2009 Knight et al.
(Continued)

FOREIGN PATENT DOCUMENTS

EP 770967 5/1997
WO WO-2013085692 A1 * 6/2013 ....... G06Q 10/06314
WO 2015199779 12/2015

OTHER PUBLICATIONS

Boyd et al., “Notes on Decomposition Methods,” Notes for EE364B, Stanford University, Winter Jul. 2006, May 11, 2015, pp. 1-36 (Year: 2015).

(Continued)

*Primary Examiner* — Russell S Glass
(74) *Attorney, Agent, or Firm* — Spencer Fane LLP; Steven J. Laureanti

(57) ABSTRACT

A system and method are disclosed for solving a supply chain planning problem modeled as a linear programming (LP) problem. Embodiments include receiving an LP problem representing a supply chain planning problem for a supply chain network comprising material buffers and resource buffers, partitioning the supply chain network at a complicating node into at least two supply chains sharing the complicating node, formulating a decomposed subproblem for each of the supply chains, calculating an effective dual based, at least in part, on a mathematical difference of at least two dual values calculated by solving the functional-based decomposed subproblems, and generating a globally-optimal LP solution to the LP problem using subgradient descent with the effective dual.

20 Claims, 17 Drawing Sheets

Related U.S. Application Data continuation of application No. 16/793,221, filed on Feb. 18, 2020, now Pat. No. 11,429,929.

(60) Provisional application No. 62/895,872, filed on Sep. 4, 2019, provisional application No. 62/856,357, filed on Jun. 3, 2019.

(51) Int. Cl.
*G06F 17/13* (2006.01)
*G06Q 10/04* (2023.01)

(58) Field of Classification Search
USPC ........................................................... 705/28
See application file for complete search history.

(56) References Cited

U.S. PATENT DOCUMENTS

| | | | | |
|---|---|---|---|---|
| 8,032,552 | B2 | 10/2011 | Davies et al. | |
| 8,112,297 | B2 | 2/2012 | Yu et al. | |
| 8,271,336 | B2 | 9/2012 | Mikurak | |
| 9,754,232 | B2 * | 9/2017 | Kamath | G06Q 10/06 |
| 9,805,330 | B2 * | 10/2017 | Surendra | G06Q 10/067 |
| 10,325,237 | B2 * | 6/2019 | Kamath | G06Q 10/0633 |
| 11,429,929 | B1 | 8/2022 | R | |
| 11,893,531 | B2 | 2/2024 | R | |
| 2002/0099598 | A1 | 7/2002 | Eicher, Jr. et al. | |
| 2002/0138314 | A1 | 9/2002 | Brown et al. | |
| 2008/0221960 | A1 * | 9/2008 | Moorkanat | G06Q 10/04<br>705/7.25 |
| 2019/0303849 | A1 * | 10/2019 | Boggarapu | G06Q 10/0835 |

OTHER PUBLICATIONS

Schwing et al., “Globally Convergent Parallel MAP LP Relaxation Solver using the Frank-Wolfe Algorithm”, Proceedings of the 31 st International Conference on Machine Learning, Beijing, China, 2014. JMLR: W&CP vol. 32. (Year: 2014).

* cited by examiner 100
110
SUPPLY CHAIN PLANNER
112
SERVER
114
DATABASE
120
INVENTORY SYSTEM
SERVER
122
DATABASE
124
130
TRANSPORTATION NETWORK
SERVER
132
DATABASE
134
140
IMAGING DEVICES
142
PROCESSOR
144
MEMORY
146
SENSOR
180
182
184
186
NETWORK
170
188
190
160
164
166
162
150
SUPPLY CHAIN ENTITIES
153
SUPPLIER
152
136
154
MANUFACTURER
155
157
DISTRIBUTION CENTER
156
158
RETAILER
159

110

SUPPLY CHAIN PLANNER
SERVER
112
202
MODELER
SOLVER
206
204
DECOMPOSITION MODULE
DATABASE
114
210
DATA MODELS
DEMAND DATA
218
212
SUPPLY CHAIN INPUT DATA
INVENTORY DATA
220
214
LP FORMULATIONS
SUPPLY CHAIN MODELS
222
216
PRODUCT DATA
INVENTORY POLICIES
224

404a
408a
408b
408c
404b
B1
O1
B2
O2
410a
408g
402a
402b
R1,3
406
400
408h
408d
408e
408f
B3
O3
B4
O4
410b
402c
404c
402d
404d

CONVERGENT SUPPLY CHAIN

```
def Constraint_Based_SC_Decomposition(G):
{
  for each entity in supply chain from most downstream to upstream:
if(entity.type='Resource'&& entity.num_loading_operation >=2) OR (entity.type='Material' &&
((entity.num_producing_flows >=2 OR entity.num_consuming_flows>=2)):
  Complicating_Connecting_Entity.add(entity)
  for each entity in Complicating_Connecting_Entity.sort(a.level < b.level):
Remove each resource_load or material_flow: list<removed_flows>
    for each operation in <removed_flows.connected_operation>:
      Connected_entities = DFS for connected nodes
    if no common connected entity:
      exit the decomposition and collected decomposed supply chains
    Else:
  for each common entity, sort(a.level < b.level)
  return decomposed supply chains, common_entity
}
def Convert_Supply_Chain_to_a_graph(Supply Chain info):
{
    //CREATE NODE:
    if(Material Storage)
    {
      NODE.add(Material storage)
    }
    if(Capacity Constraints)
    {
      NODE.add(Capacity)
    }
    //CREATE EDGE:
    if(Manufacturing Process)
    {
      EDGE.add(Manufacturing Process)
    }
    if(Distribution/Other Process)
    {
      EDGE.add(Distribution)
    }
  Return G(NODE,EDGE)
}
def G_has_balanced_components(G, balanced components, complicating_link, S_C_info):
{
  balanced components, complicating_link = Maxflow-MinCut(G, S_C_info)
}
def Domain_Aware_Decomposition_on_Divergent_Supply_Chain(Supply Chain info):
{
  // call a function that takes supply chain info and return a network graph
  G = Convert_Supply_Chain_to_a_graph(S_C_info)
  //IF G can be decomposed
  if (G_has_balanced_components(G, balanced components, complicating_link, S_C_info)):
    {
      CONNECTED_COMPONENT_LIST.add(balanced components)
      COMPLICATING_LINK.add(complicating_link)
    }
  else: // call heuristic for decomposition
  {
      CONNECTED_COMPONENT_LIST, COMPLICATING_LINK =
Constraint_Based_SC_Decomposition(G)
  }
  return CONNECTED_COMPONENT_LIST, COMPLICATING_LINK
    }
```

FIG. 11A

DIVERGENT SUPPLY CHAIN

```
def Constraint_Based_SC_Decomposition(G):
{
  for each entity in supply chain from most upstream to downstream:
if(entity.type='Resource'&& entity.num_loading_operation >=2) OR (entity.type='Material' &&
((entity.num_producing_flows >=2 OR entity.num_consuming_flows>=2)):
  Complicating_Connecting_Entity.add(entity)
  for each entity in Complicating_Connecting_Entity.sort(a.level < b.level):
Remove each resource_load or material_flow: list<removed_flows>
    for each operation in <removed_flows.connected_operation>:
      Connected_entities = DFS for connected nodes
    if no common connected entity:
      exit the decomposition and collected decomposed supply chains
    Else:
  for each common entity, sort(a.level < b.level)
  return decomposed supply chains, common_entity
}
def Convert_Supply_Chain_to_a_graph(Supply Chain info):
{
    //CREATE NODE:
    if(Material Storage)
    {
      NODE.add(Material storage)
    }
    if(Capacity Constraints)
    {
      NODE.add(Capacity)
    }
    //CREATE EDGE:
    if(Manufacturing Process)
    {
      EDGE.add(Manufacturing Process)
    }
    if(Distribution/Other Process)
    {
      EDGE.add(Distribution)
    }
  Return G(NODE,EDGE)
}
def G_has_balanced_components(G, balanced components, complicating_link, S_C_info):
{
  balanced components, complicating_link = Maxflow-MinCut(G, S_C_info)
}
def Domain_Aware_Decomposition_on_Divergent_Supply_Chain(Supply Chain info):
{
  // call a function that takes supply chain info and return a network graph
  G = Convert_Supply_Chain_to_a_graph(S_C_info)
  //IF G can be decomposed
  if (G_has_balanced_components(G, balanced components, complicating_link, S_C_info)):
    {
      CONNECTED_COMPONENT_LIST.add(balanced components)
      COMPLICATING_LINK.add(complicating_link)
    }
  else: // call heuristic for decomposition
  {
      CONNECTED_COMPONENT_LIST, COMPLICATING_LINK =
Constraint_Based_SC_Decomposition(G)
  }
  return CONNECTED_COMPONENT_LIST, COMPLICATING_LINK
    }
```

FIG. 11B

GENERIC SUPPLY CHAIN

```
def Constraint_Based_SC_Decomposition(G):
{
  for each entity in supply chain from most connected to least connected:
if(entity.type='Resource'&& entity.num_loading_operation >=2) OR (entity.type='Material' &&
((entity.num_producing_flows >=2 OR entity.num_consuming_flows>=2)):
  Complicating_Connecting_Entity.add(entity)
  for each entity in Complicating_Connecting_Entity.sort(a.level < b.level):
Remove each resource_load or material_flow: list<removed_flows>
    for each operation in <removed_flows.connected_operation>:
      Connected_entities = DFS for connected nodes
    if no common connected entity:
      exit the decomposition and collected decomposed supply chains
    Else:
  for each common entity, sort(a.level < b.level)
  return decomposed supply chains, common_entity
}
def Convert_Supply_Chain_to_a_graph(Supply Chain info):
{
    //CREATE NODE:
    if(Material Storage)
    {
      NODE.add(Material storage)
    }
    if(Capacity Constraints)
    {
      NODE.add(Capacity)
    }
    //CREATE EDGE:
    if(Manufacturing Process)
    {
      EDGE.add(Manufacturing Process)
    }
    if(Distribution/Other Process)
    {
      EDGE.add(Distribution)
    }
  Return G(NODE,EDGE)
}
def G_has_balanced_components(G, balanced components, complicating_link, S_C_info):
{
  balanced components, complicating_link = Maxflow-MinCut(G, S_C_info)
}
def Domain_Aware_Decomposition_on_Divergent_Supply_Chain(Supply Chain info):
{
  // call a function that takes supply chain info and return a network graph
  G = Convert_Supply_Chain_to_a_graph(S_C_info)
  //IF G can be decomposed
  if (G_has_balanced_components(G, balanced components, complicating_link, S_C_info)):
    {
      CONNECTED_COMPONENT_LIST.add(balanced components)
      COMPLICATING_LINK.add(complicating_link)
    }
  else: // call heuristic for decomposition
   {
      CONNECTED_COMPONENT_LIST, COMPLICATING_LINK =
Constraint_Based_SC_Decomposition(G)
   }
  return CONNECTED_COMPONENT_LIST, COMPLICATING_LINK
    }
```

| TestSet | NUMBER OF COMPLICATING CONSTRAINTS/TOTAL CONSTRAINTS (1320) | ACTUAL LPOPT RUN (IN SECONDS) (1322) | FUNCTIONAL DECOMPOSITION RUN SEQUENTIAL (IN SECONDS) (1324) | FUNCTIONAL DECOMPOSITION RUN PARALLEL (IN SECONDS) (1326) | PERCENTAGE IMPROVEMENT, SEQUENTIAL RUN (1328) | PERCENTAGE IMPROVEMENT, PARALLEL RUN (1330) |
|---|---|---|---|---|---|---|
| 1308a | **30/86866** | **98** | **78** | **70** | **20.41%** | **28.57%** |
| 1308b | 71/407915 | 185.63 | 141 | 73 | 24.04% | 60.67% |
| 1308c | 56/48074 | 40.65 | 30 | 25.53 | 26.20% | 37.20% |
| 1308d | 65/407915 | 121.28 | 79.81 | 70 | 34.19% | 42.28% |
| 1308e | 142/407915 | 117 | 69 | 59.9 | 41.03% | 48.80% |

FIG. 13B

DOMAIN-AWARE DECOMPOSITION FOR SUPPLY CHAIN MASTER PLANNING USING LINEAR PROGRAMMING

CROSS-REFERENCE TO RELATED APPLICATIONS

This application is a continuation of U.S. patent application Ser. No. 18/543,678, filed Dec. 18, 2023, entitled "Domain-Aware Decomposition for Supply Chain Master Planning using Linear Programming," which is a continuation of U.S. patent application Ser. No. 17/896,757, filed Aug. 26, 2022, entitled "Domain-Aware Decomposition for Supply Chain Master Planning using Linear Programming," now U.S. Pat. No. 11,893,531, which is a continuation of U.S. patent application Ser. No. 16/793,221, filed Feb. 18, 2020, entitled "Domain-Aware Decomposition for Supply Chain Master Planning using Linear Programming," now U.S. Pat. No. 11,429,929, which claims the benefit under 35 U.S.C. § 119 (e) to U.S. Provisional Application No. 62/856,357, filed Jun. 3, 2019, entitled "Domain-Aware Decomposition for Supply Chain Master Planning using Linear Programming," and U.S. Provisional Application No. 62/895,872, filed Sep. 4, 2019, entitled "Domain-Aware Decomposition for Supply Chain Master Planning using Linear Programming." U.S. patent application Ser. No. 18/543,678, U.S. Pat. Nos. 11,893,531 and 11,429,929, and U.S. Provisional Application Nos. 62/856,357 and 62/895,872 are assigned to the assignee of the present application.

TECHNICAL FIELD

The present disclosure relates generally to supply chain planning and specifically to systems and methods solving of linear programming supply chain planning problems using functional decomposition.

BACKGROUND

During supply chain planning, a supply chain plan may be generated by modeling and solving a supply chain planning problem as a linear programming (LP) problem. Although this approach may generate optimal solutions, it is overly time consuming, resource intensive, and often requires simplifying constraints or objectives to finish the solve within pre-specified batch solve windows. Speeding up solve times can sometimes be accomplished by decomposing a monolithic LP into multiple smaller problems, which are then solved individually. Unfortunately, monolithic LP problems are generally not amenable to standard decomposition techniques. The inability to decompose monolithic LP problems to improve solving speed of supply chain planning problems is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 11A illustrates exemplary code implementing the dividing of a convergent supply chain at a complicating node, in accordance with an embodiment;

FIG. 11B illustrates exemplary code implementing the dividing of a divergent supply chain at a complicating node, in accordance with an embodiment;

FIG. 11C illustrates exemplary code implementing the dividing of a generic supply chain at a complicating node, in accordance with an embodiment;

FIGS. 13A-13B illustrate a chart and a table comparing run time of an LP optimization method with the functional decomposition method of FIG. 9, in accordance with an embodiment.

DETAILED DESCRIPTION

Figure 1:
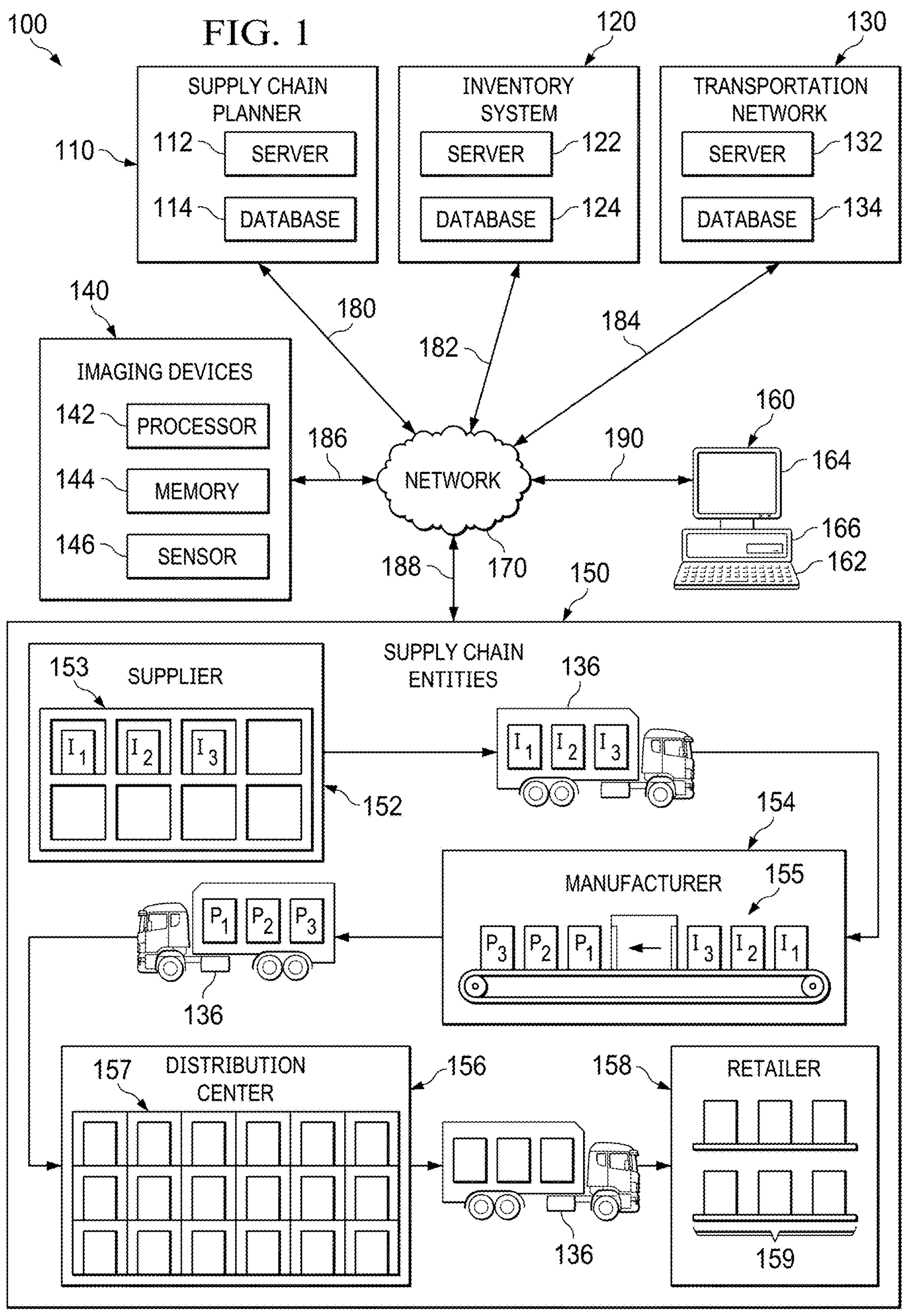
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises supply chain planner 110, inventory system 120, transportation network 130, one or more imaging devices

140, one or more supply chain entities 150, computer 160, network 170, and communication links 180-190. Although a single supply chain planner 110, a single inventory system 120, a single transportation network 130, one or more imaging devices 140, one or more supply chain entities 150, a single computer 160, and a single network 170 are shown and described, embodiments contemplate any number of supply chain planners, inventory systems, transportation networks, imaging devices, supply chain entities, computers, or networks, according to particular needs.

In one embodiment, supply chain planner 110 comprises server 112 and database 114. Server 112 comprises one or more modules that model, decompose, and solve a supply chain planning problem by utilizing the functional structure of supply chain network 100 to identify where to split the supply chain planning problem into two or more subproblems. One factor that prevents decomposing large and complicated supply chain planning problems are resource or material constraints that are common to two or more subproblems. Supply chain planner 110 identifies these common resource and material constraints (referred to herein as complicating constraints), replicates the complicating constraints across two or more subproblems, calculates an effective dual for the complicating constraints, and allocates the resources or materials of the complicating constraints using the effective dual. Solver 206 (see FIG. 2) of server 112 solves the subproblems sequentially, or in parallel, followed by masterless iteration with subgradient descent to calculate the globally-optimal solution. This approach solves hierarchical optimization problems and calculates the combined reduced-cost in the presence of smaller subproblems.

Inventory system 120 comprises server 122 and database 124. Server 122 of inventory system 120 is configured to receive and transmit product data 216 (see FIG. 2) (including, for example, item identifiers, pricing data, and attribute data), inventory data 220 (including, for example, inventory levels), and other like data about one or more items at one or more locations in supply chain network 100. Server 122 stores and retrieves data about the one or more items from database 124 or from one or more locations in supply chain network 100.

Transportation network 130 comprises server 132 and database 134. According to embodiments, transportation network 130 directs one or more transportation vehicles 136 to ship one or more items between one or more supply chain entities 150, based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein. One or more transportation vehicles 136 comprise, for example, any number of trucks, cars, vans, boats, airplanes, unmanned aerial vehicles (UAVs), cranes, robotic machinery, or the like. One or more transportation vehicles 136 may comprise radio, satellite, or other communication that communicates location information (such as, for example, geographic coordinates, distance from a location, global positioning satellite (GPS) information, or the like) with supply chain planner 110, inventory system 120, transportation network 130, one or more imaging devices 140, and/or one or more supply chain entities 150 to identify the location of one or more transportation vehicles 136 and the location of an item of any inventory or shipment located on one or more transportation vehicles 136.

One or more imaging devices 140 comprise one or more processors 142, memory 144, one or more sensors 146, and may include any suitable input device, output device, fixed or removable computer-readable storage media, or the like. According to embodiments, one or more imaging devices 140 comprise an electronic device that receives data from one or more sensors 146. One or more sensors 146 of one or more imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases.

In addition, or as an alternative, one or more sensors 146 may comprise a radio receiver and/or transmitter configured to read from and/or write to an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like device that encodes identifying information. One or more imaging devices 140 may generate a mapping of one or more items in supply chain network 100 by scanning an identifier associated with an item and identifying the item based, at least in part, on the scan. This may include, for example, a stationary scanner located at one or more supply chain entities 150 that scans items as the items pass near the scanner. As explained in more detail below, supply chain planner 110, inventory system 120, transportation network 130, and one or more imaging devices 140 may use the mapping of an item to locate the item in supply chain network 100. The location of the item may be used to coordinate the storage and transportation of items in supply chain network 100 according to one or more plans generated by supply chain planner 110 and/or a reallocation of materials or capacity. Plans may comprise one or more of a master supply chain plan, production plan, distribution plan, and the like.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with one or more of supply chain planner 110, inventory system 120, transportation network 130, one or more imaging devices 140, one or more supply chain entities 150, computer 160, and/or network 170 using one or more communication links 180-190.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. Computer 160 may include any suitable input device 162, such as a keypad, mouse, touch screen, microphone, or other device to input information. Output device 164 may convey information associated with the operation of supply chain network 100, including digital or analog data, visual information, or audio information.

Computer 160 may include fixed or removable computer-readable storage media, including a non-transitory computer-readable medium, magnetic computer disks, flash drives, CD-ROM, in-memory device or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations local to, or remote from, supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 150 may represent one or more suppliers 152, manufacturers 154, distribution centers 156, and retailers 158 of one or more supply chain networks 100, including one or more enterprises. One or more suppliers 152 may be any suitable entity that offers to sell or otherwise provides one or more components to one or more manufacturers 154. One or more suppliers 152 may, for example, receive a product from a first supply chain entity in supply chain network 100 and provide the product to another supply chain entity. One or more suppliers 152 may comprise automated distribution systems 153 that automatically transport products to one or more manufacturers 154 based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, an item that needs further processing, or any other item. One or more manufacturers 154 may, for example, produce and sell a product to one or more suppliers 152, another one or more manufacturers 154, one or more distribution centers 156, one or more retailers 158, or any other suitable customer or one or more supply chain entities 150. One or more manufacturers 154 may comprise automated robotic production machinery 155 that produce products based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more distribution centers 156 may be any suitable entity that offers to sell or otherwise distributes at least one product to one or more retailers 158, customers, or any suitable one or more supply chain entities 150. One or more distribution centers 156 may, for example, receive a product from a first supply chain entity in supply chain network 100 and store and transport the product for a second supply chain entity. One or more distribution centers 156 may comprise automated warehousing systems 157 that automatically transport an item to, remove an item from, or place an item into inventory of one or more retailers 158, customers, or one or more supply chain entities 150 based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

Although one or more suppliers 152, manufacturers 154, distribution centers 156, and retailers 158 are shown and described as separate and distinct entities, the same entity may simultaneously act as any one or more suppliers 152, manufacturers 154, distribution centers 156, and retailers 158. For example, one or more manufacturers 154 acting as a manufacturer could produce a product, and the same entity could act as one or more suppliers 158 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation network 130 may be coupled with network 170 using communication link 184, which may be any wireline, wireless, or other link suitable to support data communications between transportation network 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of distributed supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. Computer 160 may be coupled with network 170 using communication link 190, which may be any wireline, wireless, or other link suitable to support data communications between computer 160 and network 170 during operation of supply chain network 100.

Although communication links 180-190 are shown as generally coupling supply chain planner 110, inventory system 120, transportation network 130, one or more imaging devices 140, one or more supply chain entities 150, and computer 160 to network 170, each of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained local to, or external of, supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate a supply chain plan, including a supply chain master plan. Furthermore, one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products by manufacturing equipment, proportional or alternative sourcing of one or more supply chain entities 150, and the configuration and quantity of packaging and shipping of items based on the number of items currently in transit in transportation network 130, a supply chain plan, including a supply chain master plan, a solution to a supply chain planning problem, the number of items currently in stock at one or more supply chain entities 150, a forecasted demand, a supply chain disruption, a material or capacity reallocation, current and projected inventory levels at one or more stocking locations, and/or one or more additional factors described herein. For example, the methods described herein may include computers 160 receiving product data 216 from automated machinery having at least one sensor and product data 216 corresponding to an item detected by the automated machinery. Received product data 216 may include an image of the item, an identifier, as described above, and/or product information associated with the item, including, for example, dimensions, texture, estimated weight, and the like. Computers 160 may also receive, from one or more sensors 146 of one or more imaging devices 140, a current location of the identified item.

According to embodiments, the methods may further include computers 160 looking up received product data 216 in a database 114 to identify the item corresponding to product data 216 received from automated machinery. Based on the identification of the item, computers 160 may also identify (or alternatively generate) a first mapping in database 114, where the first mapping is associated with the current location of the identified item. Computers 160 may also identify a second mapping in database 114, where the second mapping is associated with a past location of the identified item. Computers 160 may also compare the first mapping and the second mapping to determine when the current location of the identified item in the first mapping is different than the past location of the identified item in the second mapping. Computers 160 may send instructions to the automated machinery based, at least in part, on one or more differences between the first mapping and the second mapping such as, for example, to locate items to add to, or remove from, an inventory or shipment of one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more detected supply chain constraints.

Figure 2:
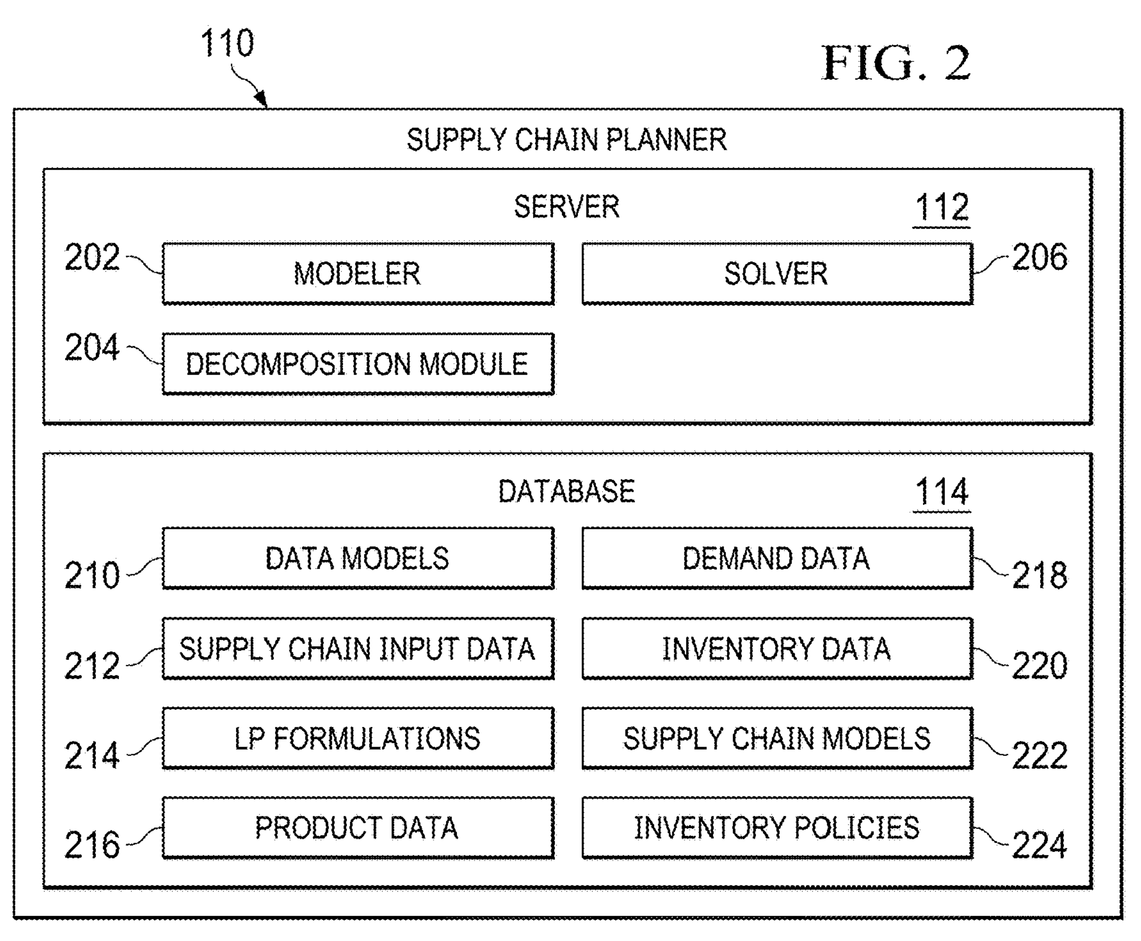
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As discussed above, supply chain planner 110 comprises server 112 and database 114. Although supply chain planner 110 is shown as comprising a single server 112 and a single database 114, embodiments contemplate any suitable number of servers or databases internal to, or externally coupled with, supply chain planner 110.

Server 112 of supply chain planner 110 may comprise modeler 202, decomposition module 204, and solver 206. Although server 112 is shown and described as comprising a single modeler 202, a single decomposition module 204, and a single solver 206, embodiments contemplate any suitable number or combination of these located at one or more locations, local to, or remote from supply chain planner 110, such as on multiple servers or computers at any location in supply chain network 100.

Modeler 202 may model one or more supply chain planning problems, such as a master planning problem, for supply chain network 100. In one embodiment, modeler 202 of server 112 models a supply chain planning problem as an LP supply chain planning problem. Additionally or as an alternative, modeler 202 of server 112 models a supply chain planning problem as a supply chain network graph. Although modeler 202 is described as modeling supply chain planning problems as LP supply chain planning problems and supply chain network graphs, embodiments contemplate modeler 202 generating other mathematical and graphical models of supply chain planning problems, according to particular needs.

Decomposition module 204 traverses supply chain network graphs to determine the configuration of nodes and edges, identify complicating constraints, and decompose the supply chain planning problem into smaller supply chains. Based on the analysis of the supply chain network graph, decomposition module 204 generates at least two decomposed subproblems from the LP supply chain planning problem.

Solver 206 of server 112 comprises one or more optimization, heuristic, or mathematical solvers that utilize functional decomposition, LP optimization, and masterless iteration to generate a solution to the master supply chain planning problem. As described in further detail below, solver 206 calculates LP solutions to subproblems representing the decomposed supply chains using masterless iteration with subgradient descent to generate globally-optimal LP solution.

Database 114 of supply chain planner 110 may comprise one or more databases or other data storage arrangement at one or more locations, local to, or remote from, server 112. Database 114 comprises, for example, data models, 210 supply chain input data 212, LP formulations 214, product data 216, demand data 218, inventory data 220, supply chain models 222, and inventory policies 224. Although database 114 is shown and described as comprising data models 210, supply chain input data 212, LP formulations 214, product data 216, demand data 218, inventory data 220, supply chain models 222, and inventory policies 224, embodiments contemplate any suitable number or combination of these, located at one or more locations, local to, or remote from, supply chain planner 110 according to particular needs.

As an example only and not by way of limitation, database 114 stores data models 210, which represent the flow of materials through one or more supply chain entities 150 of supply chain network 100. Modeler 202 of supply chain planner 110 may model the flow of materials through one or more supply chain entities 150 of supply chain network 100 as one or more data models 210 comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. According to some embodiments, the quantity of consumption and production is indicated as a weight on an edge. Although the LP supply chain planning problems are described as comprising supply chain network graphs, embodiments contemplate representing LP supply chain planning problems using other graphical models to represent LP supply chain planning problems, according to particular needs.

Supply chain input data 212 may comprise various decision variables, business constraints, goals, and objectives of one or more supply chain entities 150. According to some embodiments, supply chain input data 212 may comprise hierarchical objectives specified by, for example, business rules, master planning requirements, scheduling constraints, and discrete constraints, including, for example, sequence-dependent setup times, lot-sizing, storage, shelf life, and the like.

LP formulation 214 of database 114 include a single- or multi-objective LP supply chain master planning problems, matrix formulations of the LP supply chain master planning problem, and decomposed subproblems as well as any associated data and mappings used to formulate or solve an LP problem, such as, for example, LP constraint-variable matrix, identity of complicating constraints, decomposed subproblems, globally-optimal LP solutions, objectives, objective hierarchies, and fixed variables. According to embodiments, LP formulation comprises mathematical objective functions that represent business objectives, such as, for example, minimizing the quantity of unmet demand, minimizing usage of alternate resources (e.g. maximizing usage of primary resources), planning items as just-in-time (JIT) as possible (e.g. minimizing the amount of carried-over items), and the like. LP formulations additionally comprise mathematical constraints representing limitations to capacity, materials, lead times, and the like; and minimum and maximum values for decision variables representing lower and upper bounds. By way of example only and not of limitation, the lower and upper bounds for the capacity of a machine may be set at zero hours and ten hours, respectively. In this example, zero hours comprises the lower bound (because a machine cannot be used for a negative period of time) and ten hours represents a maximum number of hours the machine may be used in a day.

According to one embodiments, LP formulation 214 is an LP constraint-variable matrix, which comprises a sparse matrix having constraints expressed by rows, variables represented by columns, and each element comprising the coefficient of the variable for each constraint. As described in further detail below, subproblems created by decomposing master LP supply chain planning problem are submatrices of LP constraint variable matrix and comprise constraints expressed by rows, variables represented by columns, and each element comprising the coefficient of the variable for each constraint. Solver 206 creates subproblems from decomposed master LP supply chain planning problem by decomposing LP constraint variable matrix according to the entities that are allocated to each decomposed supply chain. In addition, LP formulation and/or LP constraint-variable matrix may comprise one or more additional rows or columns in the same matrix, one or more other matrices, one or more submatrices, and the like, which may store other components associated with LP problem, such as, for example, objectives, right-hand side (RHS) values, lower/upper bounds, and the like, according to particular needs. Although the LP supply chain planning problems are described as comprising LP constraint variable matrix, embodiments contemplate representing LP supply chain planning problems using other mathematical models, according to particular needs.

Product data 216 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 216 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 218 of database 114 may comprise, for example, any data relating to past sales, past demand, purchase data, promotions, events, or the like of one or more supply chain entities 150. Demand data 218 may cover a time interval such as, for example, by the minute, hour, daily, weekly, monthly, quarterly, yearly, or any suitable time interval, including substantially in real time. According to embodiments, demand data 218 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 220 of database 114 may comprise any data relating to current or projected inventory quantities or states, order rules, or the like. For example, inventory data 220 may comprise the current level of inventory for each item at one or more stocking locations across supply chain network 100. In addition, inventory data 220 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 220 in database 114, which may be used by supply chain planner 110 to place orders, set inventory levels at one or more stocking points, initiate manufacturing of one or more items (or components of one or more items), or the like. In addition, or as an alternative, inventory data 220 may be updated by receiving current item quantities, mappings, or locations from inventory system 120, transportation network 130, one or more imaging devices 140, and/or one or more supply chain entities 150.

Supply chain models 222 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 222 may comprise characteristics that specify the supply chain structure in even more detail, including, for example, specifying the type of collaboration with the customer (e.g. Vendor-Managed Inventory (VMI)), the identity of stocking locations or suppliers from which items may be sourced, customer priorities, demand priorities, how products may be allocated, shipped, or paid for, by particular customers, and the destination stocking locations or one or more supply chain entities 150 where items may be transported. Differences of these characteristics may lead to different supply chain models 222.

Inventory policies 224 of database 114 may comprise any suitable inventory policy describing the reorder point and target quantity, or other inventory policy parameters that set rules for supply chain planner 110 to manage and reorder inventory. Inventory policies 224 may be based on target service level, demand, cost, fill rate, or the like. According to embodiment, inventory policies 224 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to supply or receive inventory to replace the depleted inventory.

Figure 3:
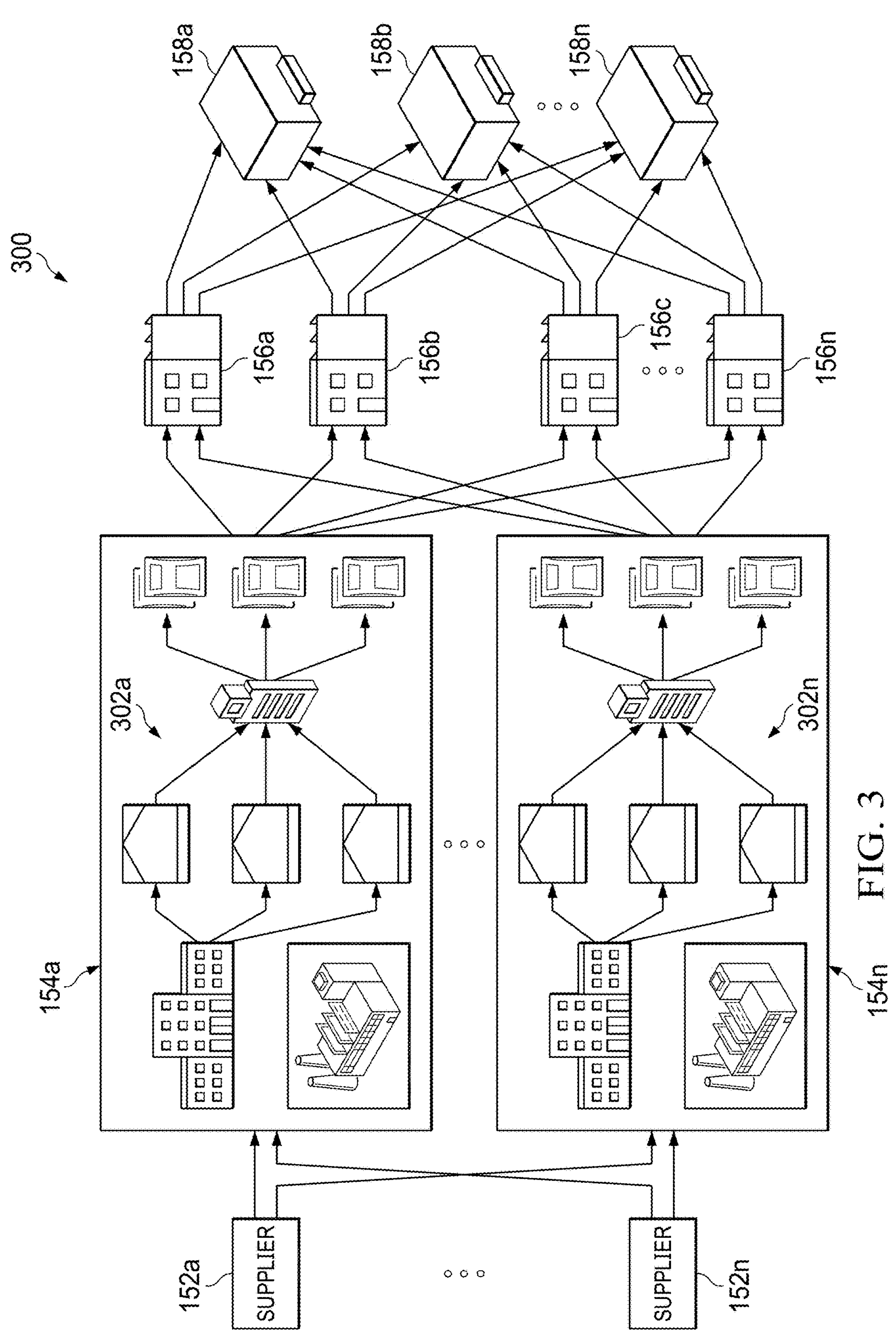
FIG. 3 illustrates an exemplary simplified supply chain network, in accordance with an embodiment.

FIG. 3 illustrates an exemplary simplified supply chain network 300, in accordance with an embodiment. Exemplary simplified supply chain network 300 comprises two or more suppliers 152*a*-152*n*, two or more manufacturers 154*a*-154*n*, four or more distribution centers 156*a*-156*n*, and three or more retailers 158*a*-158*n*. Two or more manufacturers 154*a*-154*n* receive items from two or more suppliers 152*a*-152*n* for production processes 302*a*-302*n*. Production processes 302*a*-302*n* comprise various operations for processing items, intermediate items, and finished goods, which may comprise one or more products transported to four or more distribution centers 156*a*-156*n*. Four or more distribution centers 156*a*-156*n* may transport products to three or more retailers 158*a*-158*n*. The flow of materials, items, and products among the two or more suppliers 152*a*-152*n*, two or more manufacturers 154*a*-154*n*, four or more distribution centers 156*a*-156*n*, and three or more retailers 158*a*-158*n* of exemplary simplified supply chain network 300 must meet demand requirements while being limited by constraints of capacity, materials, lead times, transportation, sourcing, and/or the like. Although a simplified exemplary supply chain network 300 is illustrated as comprising two or more suppliers 152*a*-152*n*, two or more manufacturers 154*a*-154*n*, four or more distribution centers 156*a*-156*n*, and three or more retailers 158*a*-158*n*, supply chain network 100 may comprise any number of one or more supply chain entities 150, according to particular needs. For example, supply chain network 100 often comprises multiple manufacturing plants located in different regions or countries. In addition, an item may be processed from many materials by many operations into a large number of different intermediate goods and/or finished items, where the different operations may have multiple constrained resources and multiple input items, each with their own lead, transportation, production, and cycle times. Additionally, materials and resources may flow upstream, downstream, or both, subject to material and capacity constraints and demand requirements.

Figure 4:
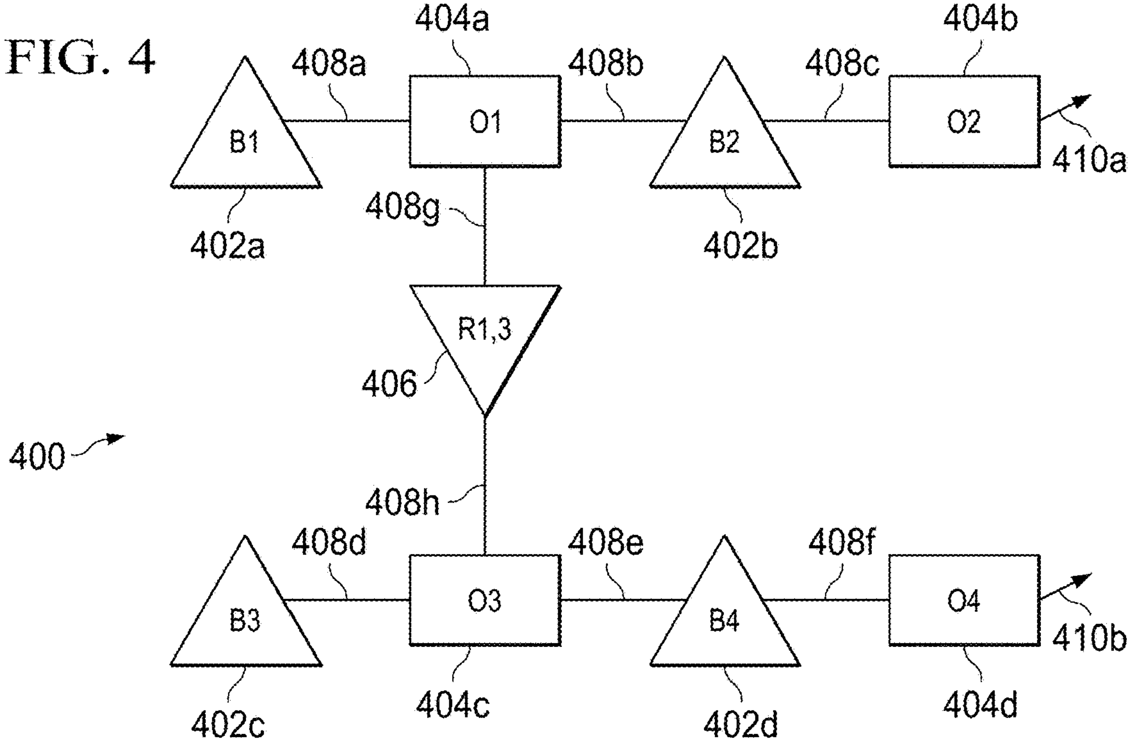
FIG. 4 illustrates an exemplary simplified supply chain network, in accordance with an embodiment.

FIG. 4 illustrates exemplary simplified supply chain network 400, according to an embodiment. Modeler 202 models simplified supply chain network 400 to generate a supply chain network model representing the flow of items and resources between nodes. In one embodiment, modeler 202 creates a supply chain network model representing the flow of items and resources between nodes, in accordance with the constraints at each operation and buffer. As disclosed above, items may comprise, for example, components, materials, products, parts, supplies, or other items. In one embodiment, items flow from upstream nodes to downstream nodes along edges from left to right. This flow may represent, for example, raw materials at upstream nodes being transformed into finished products at downstream nodes. However, flows may be bidirectional, and one or more items may flow from right to left, from a downstream node to an upstream node, according to particular needs. According to one embodiment, simplified supply chain network 400 comprises four material buffers (B1-B4) 402*a*-402*d*, four operations (O1-O4) 404*a*-404*d*, and a single resource buffer (R1,3) 406 connected by edges 408*a*-408*h*. First operation (O1) 404*a* and third operation (O3) 404*c* share capacity of resource buffer (R1,3) 406. Satisfaction of demand 410*a* depends on the allocation of capacity of resource buffer (R1,3) 406 to first operation (O1) 404*a*, and the satisfaction of demand 410*b* depends on the allocation of capacity of resource buffer (R1,3) 406 to third operation (O3) 404*c*.

Figure 5:
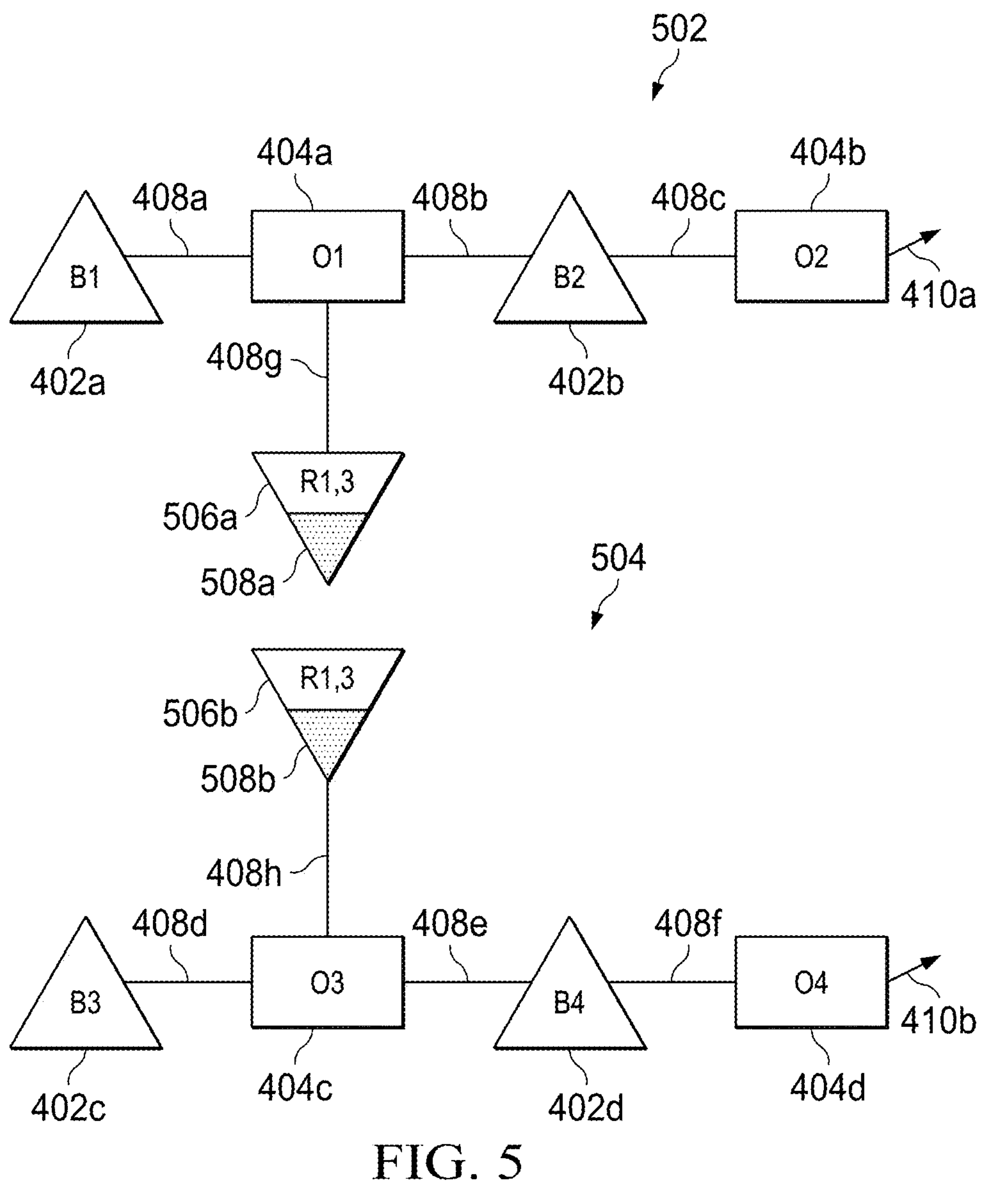
FIG. 5 illustrates decomposition of the exemplary simplified supply chain network of FIG. 4 into simplified decomposed supply chains, in accordance with an embodiment.

FIG. 5 illustrates decomposition of the exemplary simplified supply chain network 400 of FIG. 4 into simplified decomposed supply chains 502 and 504, according to an embodiment. By setting the shared resource buffer (R1,3) 406 as the complicating constraint, supply chain planner 110 duplicates resource buffer (R1,3) 406 and decomposes exemplary simplified supply chain network 400 into two supply chains 502 and 504. Each of supply chains 502 and 504 receive one of duplicated resource buffers (R1,3) 506*a*-506*b*. Duplicated resource buffers (R1,3) 506*a*-506*b* receive an allocation of the original capacity of resource buffer (R1,3) 406. In one embodiment, first capacity 508*a* allocated to first duplicated resource buffer (R1,3) 506*a* is a percentage (e.g. x %) of the total original capacity of resource buffer (R1,3) 406, and second capacity 508*b* allocated to second duplicated resource buffer (R1,3) 506*b* is the remaining percentage (e.g. (100−x) %) of the total original capacity of resource buffer (R1,3) 406. By way of example only and not of limitation, if the original capacity of resource buffer (R1,3) 406 is 300 units and forty percent is allocated to first capacity 508*a* of first duplicated resource buffer (R1,3) 506*a* and sixty percent is allocated second capacity 508*b* of second duplicated resource buffer (R1,3) 506*b*, then first duplicated resource buffer (R1,3) 506*a* would receive 120 units of capacity, and second duplicated resource buffer (R1,3) 506*b* would receive 180 units. Although the allocation of capacity to duplicated resource buffers (R1,3) 506*a*-506*b* is described as 40% and 60% of a total original capacity of 300 units, embodiments contemplate any suitable allocation of any total original capacity to any suitable number of duplicated resource buffers, according to particular needs. Further, each different allocation of capacity between duplicated resource buffers (R1,3) 506*a*-506*b* will differently affect the satisfaction of demands 410*a*-410*b*. An optimal allocation to capacities 508*a*-508*b* of duplicated resource buffers (R1,3) 506*a*-506*b* satisfies demands 410*a*-410*b* equal to the quantity of the optimal supply chain plan.

As described in further detail below, supply chain planner 110 may decompose a single supply chain network such as, for example, exemplary simplified supply chain network 400 into models of two supply chains which share a common material or resource constraint, such as, for example, simplified decomposed supply chains 502 and 504, which share capacity of resource buffer (R1,3) 406. Supply chain planner 110 partitions the supply chain network at one or more nodes (representing a complicating constraint) and models and formulates LP subproblems for each of the smaller, divided supply chains. Depending on the location of the one or more shared constraints in a supply chain network, decomposition module 204 of supply chain planner 110 may utilize a different decomposition process. In one embodiment, supply chain planner 110 classifies supply chain networks according to three classifications: convergent, divergent, and generic. Based on the assigned classification, supply chain planner 110 selects a decomposition process that is customized for supply chain networks of the assigned classification. In one embodiment, classifying supply chain networks comprises modeler 202 of supply chain planner 110 generating a supply chain graph based on the supply chain network model.

Figure 6:
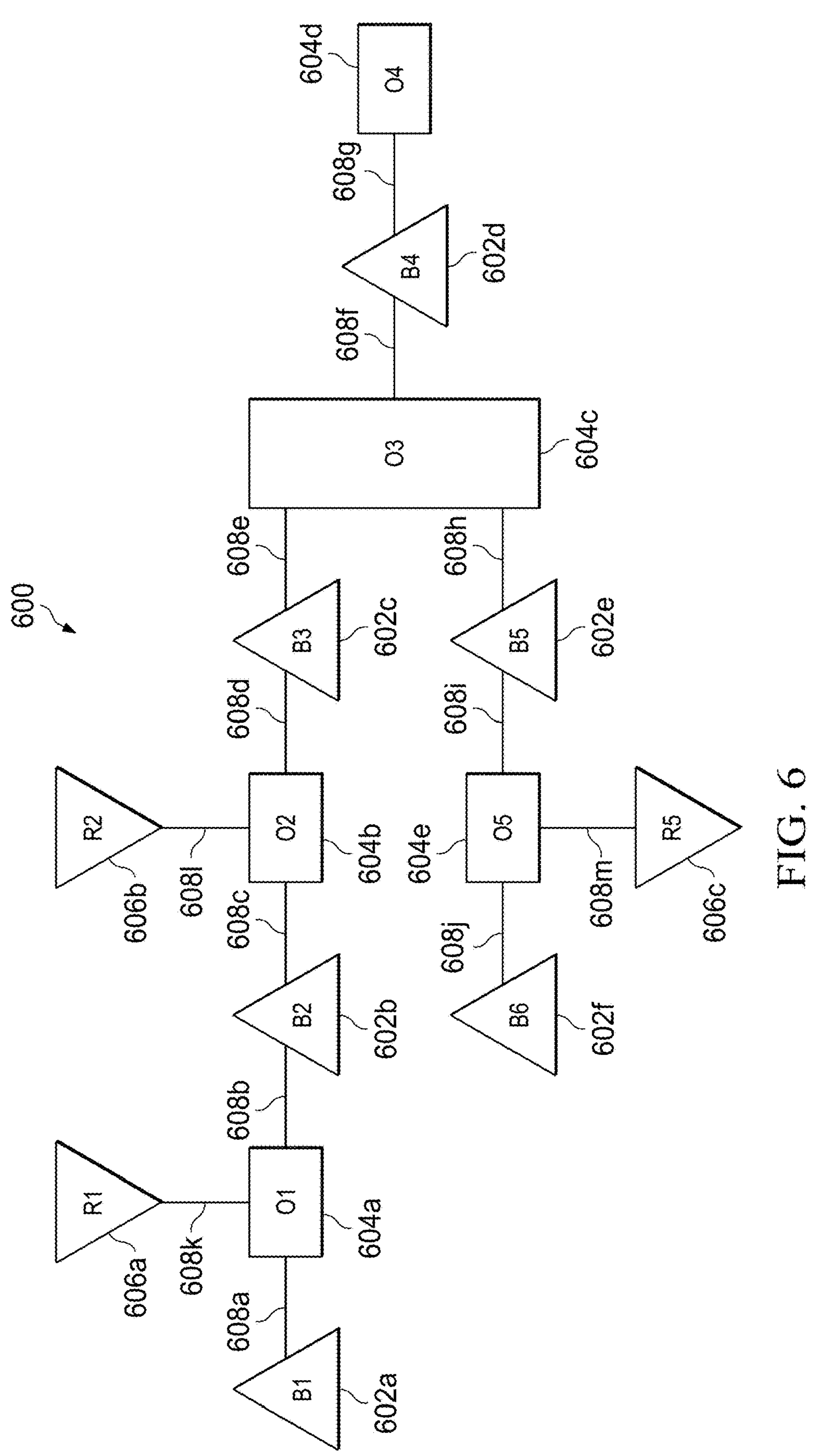
FIG. 6 illustrates an exemplary simplified supply chain network, in accordance with an embodiment.

FIG. 6 illustrates an exemplary simplified supply chain network 600, according to a further embodiment. Simplified supply chain network 600 comprises six material buffers (B1-B6) 602*a*-602*f* storing items, five operations (O1-O5) 604*a*-604*e* for processing items, and three resource buffers (R1, R2, and R5) 606*a*-606*c*, which represent capacity limitations on each of the operations to which they are connected. Four operations (O1, O2, O4, O5) 604*a*-604*d* have a single item as input and a single item as output. A single operation (O3) 604*c* requires two items as input (i.e. materials or items stored at buffers B3 and B5) and produces a single item as output (materials or items stored at buffer B4).

By way of example only and not of limitation, supply chain network 600 stores raw materials at the most upstream material buffers (B1 and B6) 602*a* and 602*f*. Material buffers (B1 and B6) 602*a* and 602*f* may receive raw materials as the initial input for a manufacturing process. Raw materials may comprise, for example, metal, fabric, adhesives, polymers, and other materials and compounds used during manufacturing. The flow of raw materials from materials buffers (B1 and B6) 602*a* and 602*f* is indicated by edges 608*a* and 608*j*, which identify operations (O1 and O5) 604*a* and 604*e* as a possible destination for the raw materials. Operations (O1 and O5) 604*a* and 604*e* may comprise production processes that receive raw materials and produce one or more intermediate items, which are then stored at material buffers (B2 and B5) 602*b* and 602*e* as indicated by edges 608*b* and 608*i*. Operations (O1 and O5) 604*a* and 604*e* are additionally coupled by edges 602*a* and 602*c* with resource buffers (R1 and R5) 606*a* and 606*c* to indicate that operations (O1 and O5) 604*a* and 604*e* require the resources from resource buffers (R1 and R5) 606*a* and 606*c* to process raw materials stored at the most upstream material buffers (B1 and B6) 602*a* and 602*f* into intermediate items stored at material buffers (B2 and B5) 602*b* and 602*e*. According to embodiments, resources represented by resource buffers (R1 and R5) 606*a* and 606*c* may include, for example, equipment or facilities for manufacturing, distribution, or transportation. Although resource buffers (R1 and R5) 606*a* and 606*c* are described as comprising equipment or facilities for manufacturing, distribution, or transportation, embodiments contemplate any number of one or more resource buffers representing other suitable resources utilized in supply chain operations, according to particular needs.

According to embodiments, edges 608*a*-608*j* and 610*a*-610*c* represent limitations on supplying items to particular buffers including, but not limited to, for example, transportation limitations (such as, for example, cost, time, available transportation options) or outputs of various operations (such as, for example, different production processes, which produce different items, each of which may be represented by a different SKU, and which each may be stored at different buffers). For the exemplary simplified supply chain network 600, transportation processes may transport, package, or ship intermediate and finished goods to one or more locations internal to or external of one or more supply chain entities 150 of supply chain network 100, including, for example, shipping directly to consumers, to regional or strategic distribution centers, or to the inventory of one or more supply chain entities 150, including, for example, to replenish a safety stock for one or more items in an inventory of one or more supply chain entities 150. Additionally, particular items and operations described herein comprise a simplified description for the purpose of illustration. Items may, for example, comprise different sizes, styles, or states of a same or a different item. Similarly, an operation may be any process or operation, including manufacturing, distribution, transportation, or any other suitable action of the supply chain network. Although the limitation of the flow of items between nodes of simplified supply chain network 600 is described as cost, timing, transportation, or production limitations, embodiments contemplate any suitable flow of items (or limitations of the flow of items) between any one or more different nodes of simplified supply chain network 600, according to particular needs. In one embodiment, simplified supply chain network 600 includes additional constraints, such as, for example, business constraints, operation constraints, and resource constraints, which facilitate one or more other planning rules. Although simplified supply chain network 600 is shown and described as having a particular number and configuration of material buffers 602*a*-602*f*, operations 604*a*-604*e*, resource buffers 606*a*-606*c*, and edges 608*a*-608*j* and 610*a*-610*c*, embodiments contemplate any number of buffers, resources, operations, and edges with any suitable flow between them, according to particular needs.

Figure 7:
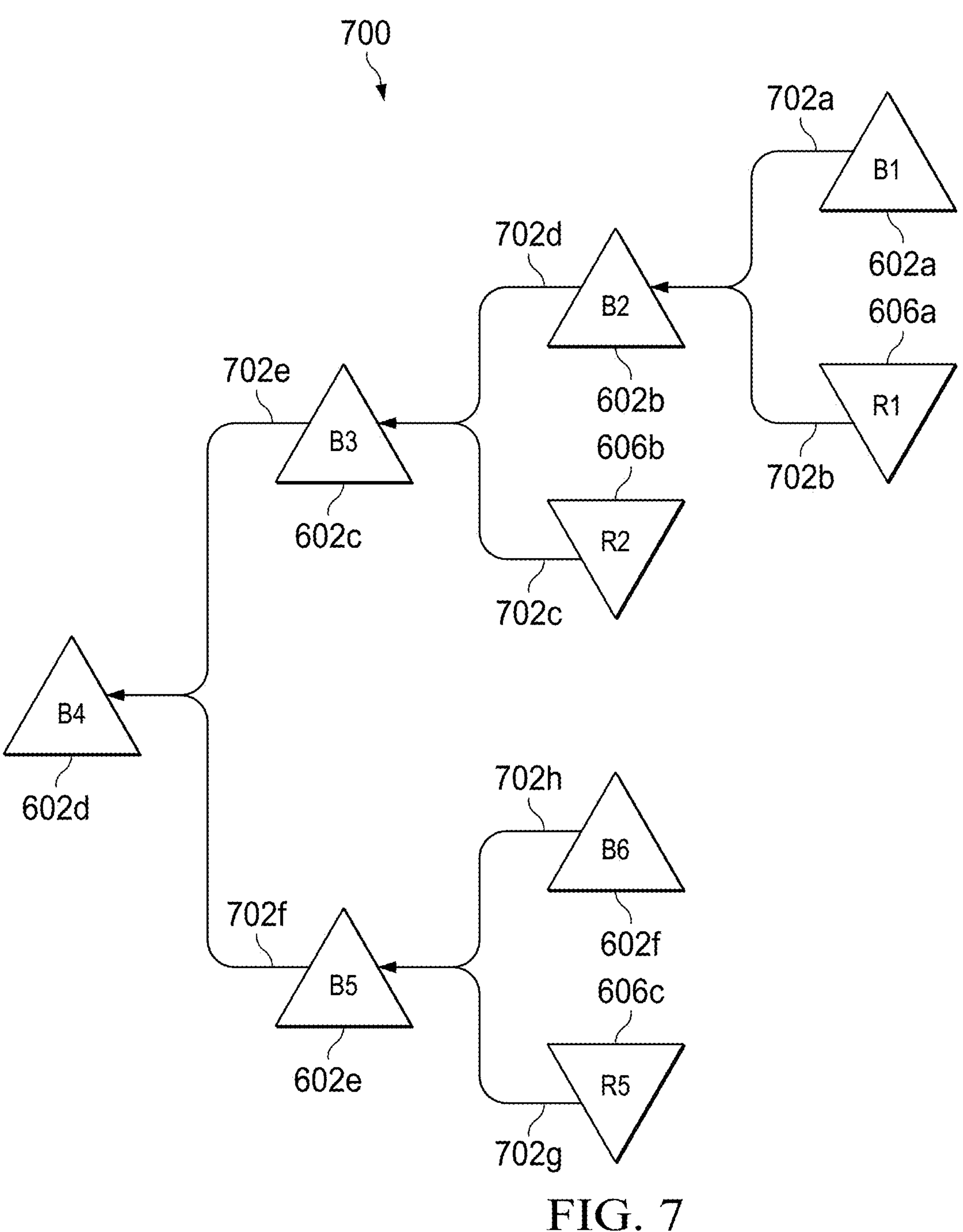
FIG. 7 illustrates an exemplary supply chain graph representing the exemplary simplified supply chain network of FIG. 6, in accordance with an embodiment.

FIG. 7 illustrates exemplary supply chain graph 700 representing exemplary simplified supply chain network 600 of FIG. 6, in accordance with an embodiment; Supply chain graph 700 comprises a modeled graph of simplified supply chain network 600. Supply chain graph 700 comprises a model of nodes and edges, wherein nodes represent material and resource buffers and edges represent consuming, producing, or loading an item or resource. According to an embodiment, decomposition module 204 applies a maxflow-mincut process to a supply chain graph to determine partitioning of a supply chain planning problem into balanced subproblems.

Supply chain graph 700 comprises material buffer nodes 602*a*-602*f* (B1, B2, B3, B4, B5, and B6), which indicate a particular item at a particular location in supply chain network 100. Material buffer nodes 602*a*-602*f* correspond to storage constraints of material buffer nodes 602*a*-602*f* of simplified supply chain network 600. Resource buffer nodes 606*a*-606*c* (R1, R2, and R5) indicate a resource having a particular capacity, such as, for example, transportation, manufacturing, or other activities, and correspond to resource buffer nodes 606*a*-606*c* of simplified supply chain network 600. Each of edges 702*a*-702*h* represent consumption, production, or loading of an item or resource from one or more material buffer nodes 602*a*-602*f* or one or more resource buffer nodes 606*a*-606*c* to one or more other material buffer nodes 602*a*-602*f* or resource buffer nodes 606*a*-606*c*. By way of example only and not by way of limitation, edges 702*a*-702*b* connecting material buffer node B1 602*a* and resource buffer node R1 606*a* to material buffer node B2 602*b*, indicate that a supply of materials from material buffer B1 and a capacity of a resource at resource buffer R1 are consumed to generate the material represented by material buffer B2. In addition, each of edges 702*a*-702*h* comprises a weight corresponding to the number of units of material or resource consumed for each unit of material produced. Using these weights, decomposition module 204 uses a maxflow-mincut process to identity the minimum number of nodes that, if removed, generates decomposed and balanced subproblems. When decomposition module 204 cannot partition the supply chain network using the maxflow-mincut process, supply chain planner 110 decomposes the supply chain network using a decomposition process that is customized according to the classification of the supply chain network as convergent, divergent, or generic, as described in further detail below.

Figure 8A:
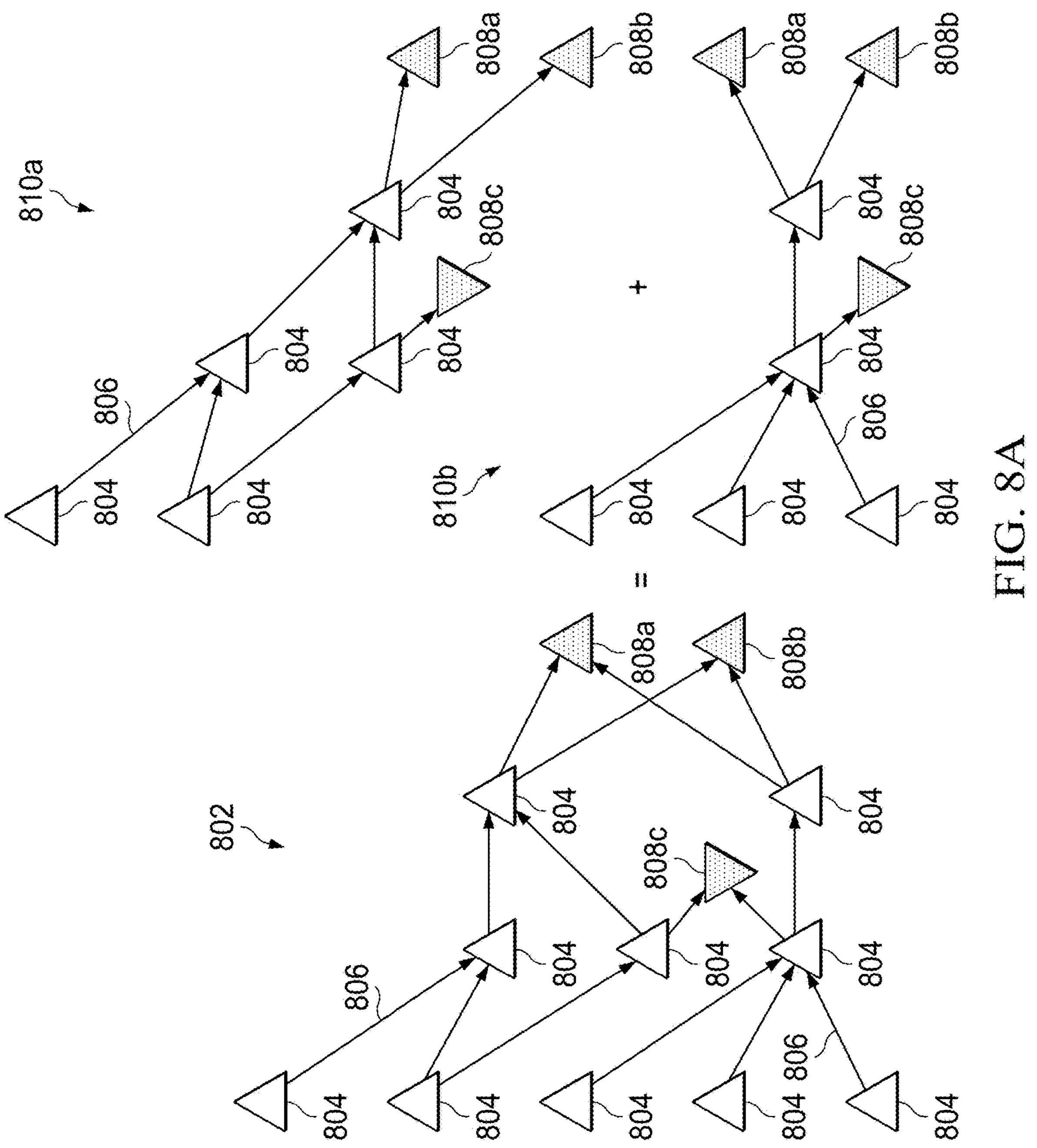
FIG. 8A illustrates an exemplary simplified convergent supply chain network, in accordance with an embodiment.

FIG. 8A illustrates exemplary simplified convergent supply chain network 802, in accordance with an embodiment. Simplified convergent supply chain network 802 comprises buffer nodes 804, edges 806, and complicating constraint nodes 808*a*-808*c*. Complicating constraint nodes 808*a*-808*c* comprise two complicating material constraint nodes 808*a*-808*b* and a single complicating resource constraint node 808*c*. A convergent supply chain network such as simplified convergent supply chain network 802 proceeds from a larger number of upstream material and resource buffer nodes 804 to a smaller number of downstream material and resource buffer nodes 804. When a supply chain network has a convergent structure, complicating constraints are more likely to be located at the downstream side of the supply chain network (as indicated by complicating constraint nodes 808*a*-808*c*). Accordingly, when decomposition module 204 searches supply chain network for complicating constraints to partition a convergent supply chain network into two or more subproblems, decomposition module 204 begins searching from the most downstream material and resource buffer nodes 804. As stated above, when decomposing a supply chain network into two or more supply chains, decomposition module 204 replicates complicating constraint nodes 808*a*-808*c* in each of the two or more supply chains sharing the complicating material or resource. In the illustrated example, simplified convergent supply chain 802 is decomposed into two supply chains by partitioning simplified convergent supply chain network 802 into simplified decomposed convergent supply chains 810*a*-810*b* and replicating complicating constraint nodes 808*a*-808*c* in both supply chains.

Figure 8B:
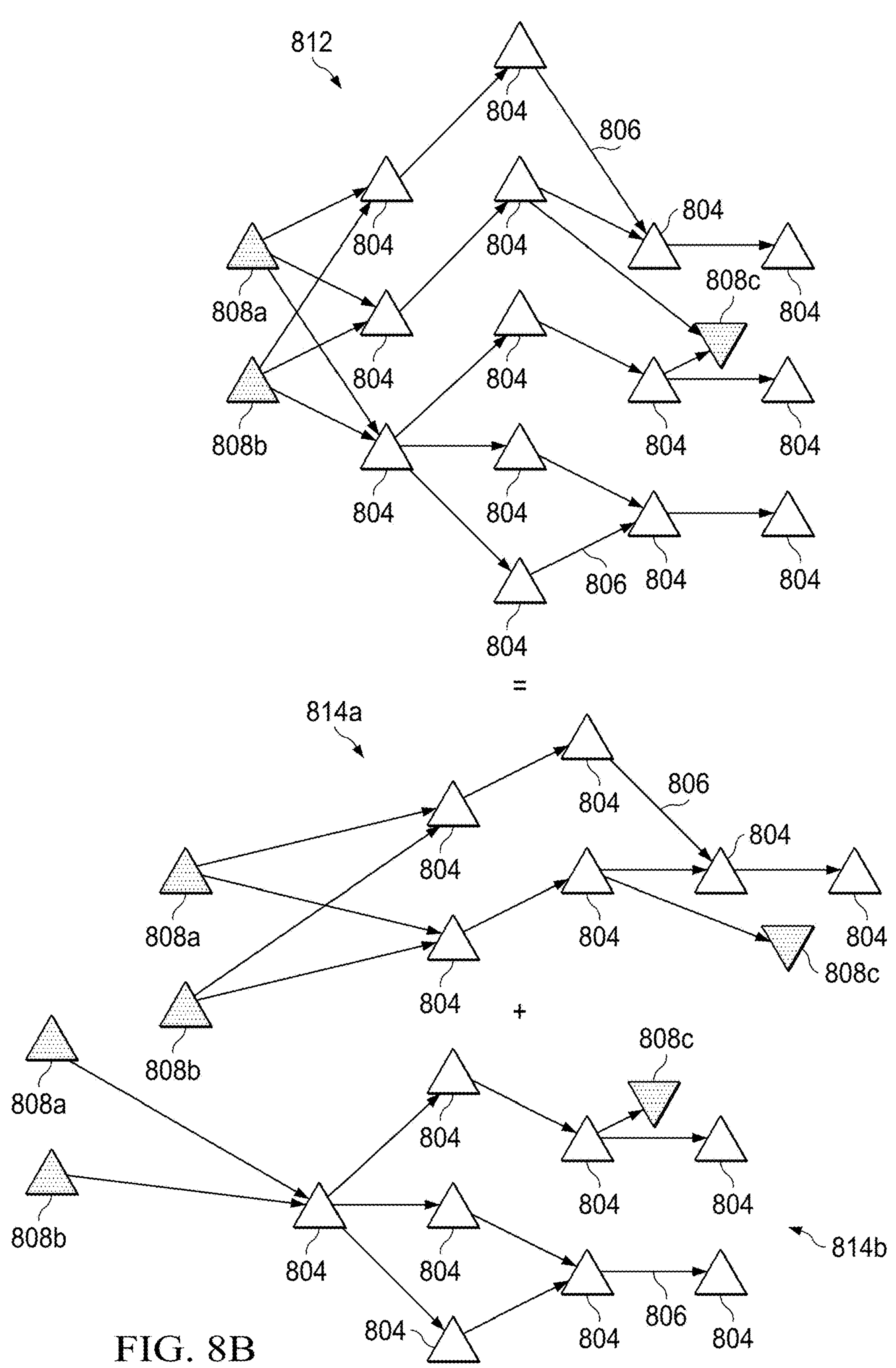
FIG. 8B illustrates an exemplary simplified divergent supply chain network, in accordance with an embodiment.

FIG. 8B illustrates exemplary simplified divergent supply chain network 812, in accordance with an embodiment. In contrast to simplified convergent supply chain network 802, simplified divergent supply chain network 812 comprises a smaller number of upstream material and resource buffer nodes 804 becoming a larger number of downstream material and resource buffer nodes 804. When a supply chain network has a divergent structure, complicating constraints are more likely to be located at the upstream side of the supply chain network (as indicated by complicating material constraint nodes 808*a*-808*b*). Accordingly, when decomposition module 204 searches supply chain network for complicating constraints to partition a divergent supply chain network into two or more subproblems, decomposition module 204 begins searching from the most upstream material and resource buffer nodes 804. In the example of the illustrated embodiment, simplified divergent supply chain network 812 is decomposed into two supply chains by partitioning simplified divergent supply chain network 812 into simplified decomposed divergent supply chains 814*a*-814*b* and replicating complicating constraint nodes 808*a*-808*c* in both supply chains.

Figure 8C:
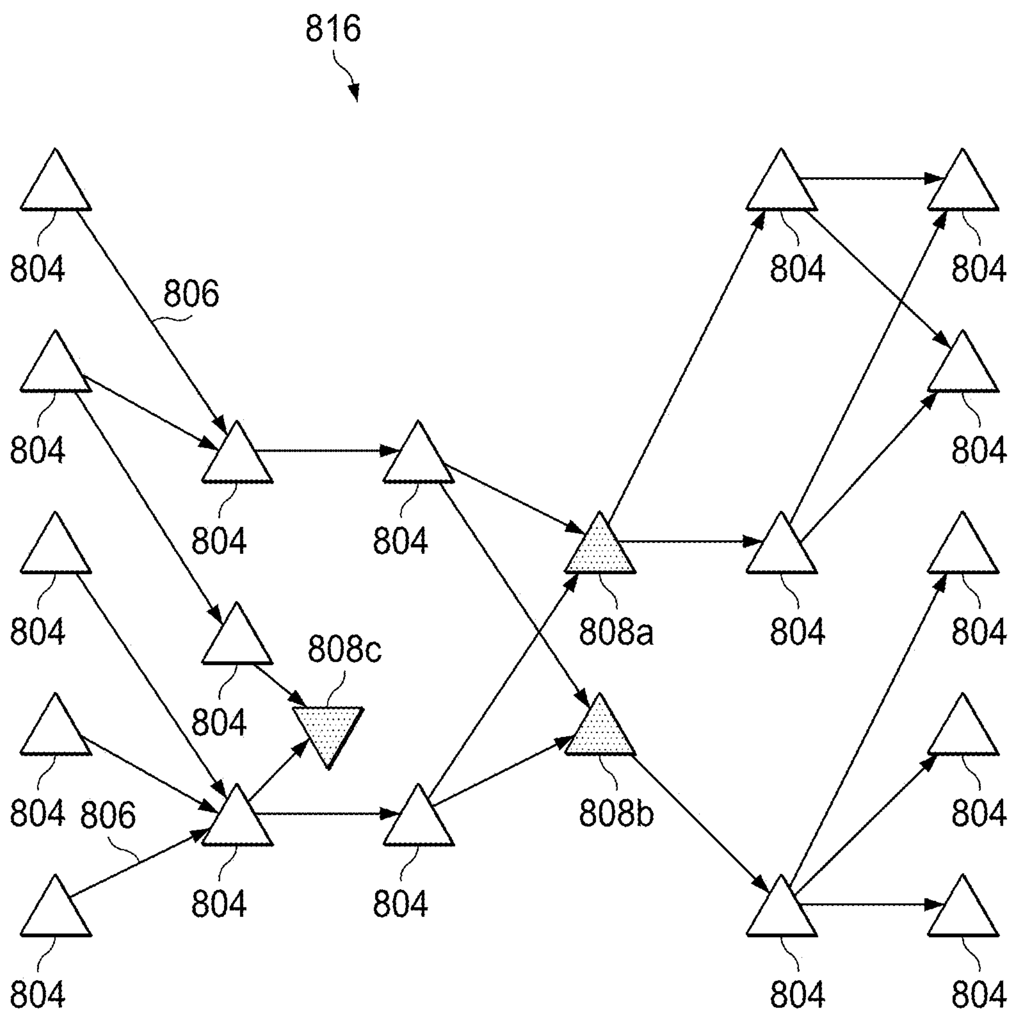
FIG. 8C illustrates an exemplary simplified generic supply chain network, in accordance with an embodiment.

FIG. 8C illustrates exemplary simplified generic supply chain network 816, in accordance with an embodiment. When a supply chain network is not classified as convergent or divergent, supply chain planner 110 assigns the supply chain network a generic classification. Simplified generic supply chain network 816 does not comprise either a larger number of upstream material and resource buffer nodes 804 becoming a smaller number of downstream material and resource buffer nodes 804 or a smaller number of upstream material and resource buffer nodes 804 becoming a larger number of downstream material and resource buffer nodes 804. When a supply chain network has a generic structure, complicating constraints are more likely to be located at nodes having a greater number of connections with other nodes in the network (as indicated by complicating material constraint nodes 808*a*-808*b*, each having four connections with other material and resource buffer nodes 804). Accordingly, when decomposition module 204 searches supply chain network for complicating constraints to partition a generic supply chain network into two or more subproblems, decomposition module 204 begins searching from the material and resource buffer nodes 804 having the most connections with other material and resource buffer nodes 804. Although the decomposition of simplified generic supply chain network 816 is not illustrated, embodiments contemplate partitioning and replicating complicating constraint nodes 808*a*-808*c* into any number of two or more decomposed supply chains, according to particular needs.

Figure 9:
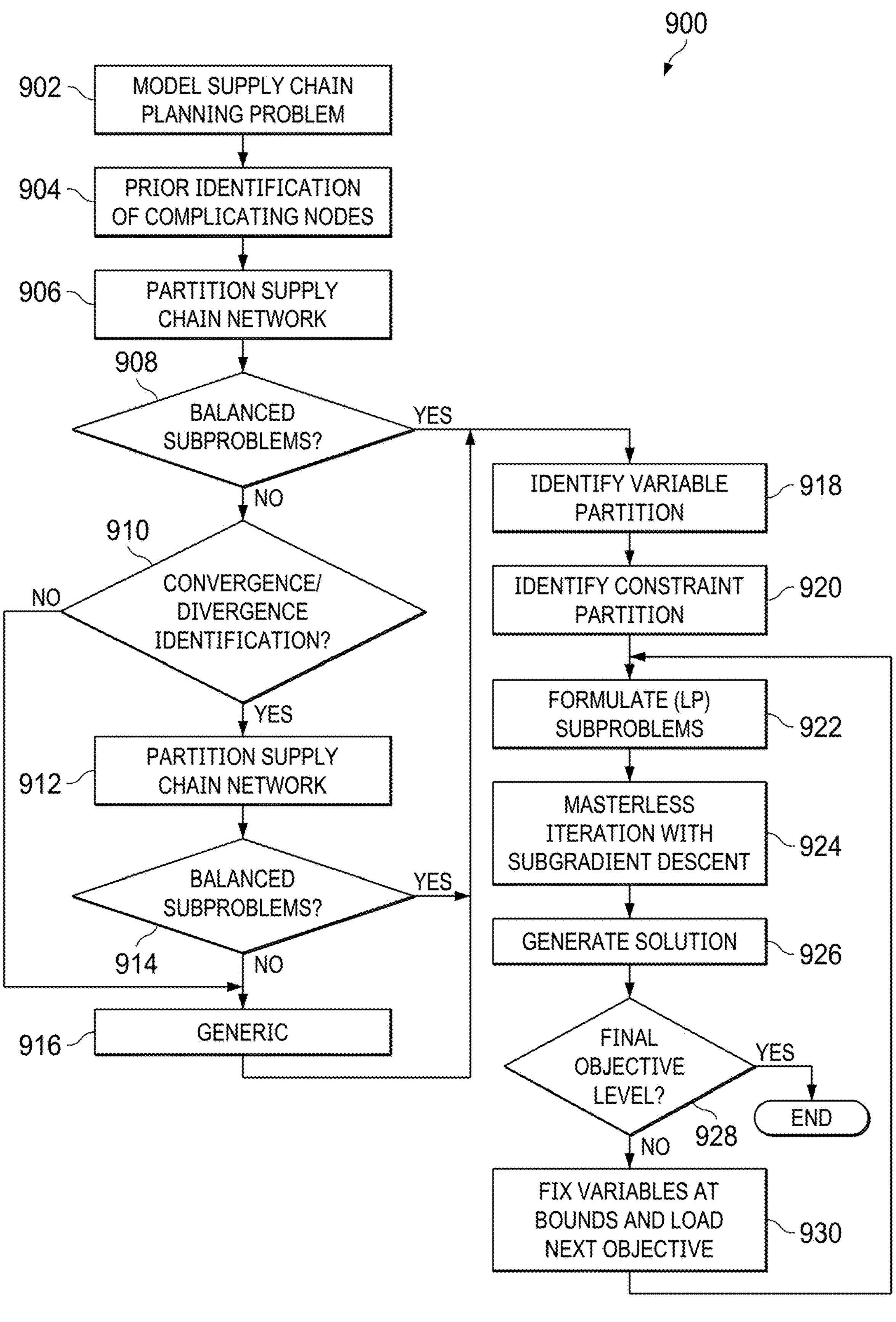
FIG. 9 illustrates a method of solving a supply chain planning problem by functional decomposition, in accordance with an embodiment.

FIG. 9 illustrates method 900 of solving a supply chain planning problem by functional decomposition, in accordance with an embodiment. Exemplary method 900 proceeds by one or more activities, which although described in a particular order may be performed in one or more permutations, according to particular needs.

Method 900 begins at activity 902, where modeler 202 of supply chain planner 110 models a supply chain planning problem of supply chain network 100 as a linear programming LP problem. As stated above, modeler 202 generates an LP master supply chain planning problem by modeling the materials, resources, operations, constraints, and objectives of supply chain network 100.

At activity 904, decomposition module 204 checks for prior identification of complicating nodes. To identify previously identified complicating nodes, decomposition module 204 may check data models 210 for previous decomposed supply chains and/or check current and historical supply chain data for underutilized or flexible constraints. As disclosed above, supply chain planner 110 decomposes an LP master supply chain planning problem by partitioning the supply chain network of the modeled supply chain planning problem at one or more complicating nodes. According to embodiments, decomposition module 204 checks data models 210 for previously identified complicating nodes to determine whether material or resource buffers for the supply chain network of the current supply chain planning problem have been previously identified as complicating constraints. In addition, or as an alternative, decomposition module 204 analyzes results of previous supply chain planning solves, which may be stored as LP formulations 214, to search resources for capacities that are not fully used and material buffers having above-average unused remaining inventory. Embodiments of decomposition module 204 further contemplate searching alternate or additional sources of materials and capacity to identify flexible constraints. Material constraints may be flexed by, for example, locating a cheap alternate supplier of an item or subcontracting production, operation, or transportation to increase material availability and storage at one or more constrained buffers. Resource constraints may be flexed by, for example, using overtime labor to increase availability of one or more resources, such as, for example, operating or repairing production machinery. Although particular examples of flexible constraints are described, embodiments contemplate flexing any material or resource constraint using any suitable method or source, according to particular needs.

At activity 906, decomposition module 204 partitions the supply chain network of the modeled supply chain planning problem based, at least in part, on the complicating constraints identified at activity 904. According to one embodiment, decomposition module 204 partitions the supply chain network of the modeled supply chain planning problem at one or more of the complicating constraints that are identified as complicating nodes.

At activity 908, decomposition module 204 determines whether the resulting decomposed supply chains generate balanced subproblems. Decomposition module 204 may determine subproblems are balanced by checking the subproblems have equal sizes. According to embodiments, the size of as subproblem is the number of its constraints. In many instances, decomposition module 204 cannot decompose the multi-period supply chain planning problem into two subproblems having equal size and complexity. When the subproblems do not have equal size, decomposition module 204 may determine the decomposed subproblems are balanced by evaluating the difference in the size of the subproblems is minimized. For example, when decomposition module 204 determines that the division of the multi-objective supply chain planning problem is not equal, decomposition module 204 selects the functional decomposition that provides subproblems having similar sizes by checking that the difference between the number of constraints of each subproblem is minimized.

When the previously identified complicating constraints partition supply chain network into smaller supply chains that generate balanced subproblems, functional decomposition method 900 continues to activity 918, where decomposition module 204 identifies a variable partition.

When the previously-identified complicating constraints cannot be used to partition supply chain network into balanced subproblems, method 900 continues to activity 910, where decomposition module 204 analyzes a supply chain network graph to determine whether the supply chain network of the modeled supply chain planning problem is convergent or divergent. When the supply chain network is identified as convergent or divergent, method 900 continues to activity 912, where decomposition module 204 partitions the supply chain network. As described in further detail below, decomposition module 204 partitions the supply chain network using method 1000 (FIG. 10) with a modification that improves partitioning speed of convergent or divergent supply chain networks.

At activity 914, decomposition module 204 determines whether the resulting decomposed supply chains generate balanced subproblems. As disclosed above, decomposition module 204 may check whether the subproblems are balanced by evaluating the difference in the number of constraints between the subproblems.

When the supply chain network cannot be identified as convergent or divergent at activity 910 or when solver 206 determines that the subproblems are not balanced at activity 914, method 900 continues to activity 916, where solver 206 partitions the supply chain network using method 1000 with a modification for generic supply chain networks. According to embodiments, generic supply chain networks are supply chain networks that decomposition module 204 is unable to classify as convergent or divergent.

In response to decomposition module 204 determining that the subproblems are balanced at activity 914 or after partitioning the subproblems using the generic modification of method 1000 at activity 916, method 900 continues to activity 918, where decomposition module 204 partitions the variables of the subproblems by removing variables from each of the subproblems, which were present in the master supply chain planning problem (before decomposition), but which are not present in the decomposed subproblem.

At activity 920, supply chain planner partitions the constraints of the subproblems. In one embodiment, decomposition module 204 partitions the constraints by generating a list of the constraints of the master supply chain planning problem for each of the decomposed subproblems.

At activity 922, modeler 202 formulates LP subproblems based on the variable and constraint partitions that decomposition module 204 identifies from the functional decomposition. Modeler 202 formulates functional-based decomposed subproblems by dividing the original LP supply chain master planning problem at one or more decomposition boundaries and generating at least two independent subproblems sharing, as their common element, one or more complicating constraints. According to one embodiment, each of functional-based decomposed subproblems comprise LP optimization problems and may be represented by a matrix formulation and solved at the matrix level.

At activity 924, solver 206 performs masterless iteration with subgradient descent. According to embodiments, solver 206 calculates the effective dual for the decomposed subproblems, updates the subproblems, monitors for convergence or one or more stopping criteria, and iteratively updates the LP problems until one or more stopping criteria are detected, as described in further detail below. When the masterless iteration with subgradient converges or one or more stopping criteria are detected, solver 206 generates the solution to the master LP supply chain planning problem at activity 926.

At activity 928, supply chain solver 206 checks whether the current objective of the LP subproblems is the final objective. When supply chain solver 206 determines the current objective is not the final objective, method 900 continues to activity 930, where solver 206 calculates the reduced cost and updates the upper and lower bounds for the current objective level to preserve the optimality of the generated solution, accesses the objective formulation for the next objective, and returns to activity 922, where solver 206 updates and iteratively solves the functional-based decomposed subproblems for the new objective. According to one embodiment, solver 206 of supply chain planner 110 solves functional-based decomposed subproblems by iteratively loading and solving the functional-based decomposed subproblems for each objective in accordance with an order described by a hierarchy of the objectives. A hierarchy of the objectives indicates that the hierarchical objectives are solved in the order indicated by the hierarchy, from an objective higher in the hierarchy (higher order or higher priority objective) to an objective lower in the hierarchy (lower order or lower priority objective). According to embodiments, the hierarchical order of the objectives indicates the order of importance of the objectives (such as, for example, the first objective is more important than the second objective; the second objective is more important than the third objective, etc.). When solving the functional-based decomposed subproblems for one or more lower objectives, solver 206 sets decision variables at their upper or lower bounds (which may be referred to as variable fixing) to retain the objective value of one or more higher objectives. After solving the functional-based decomposed subproblems for a current objective and using masterless iteration with subgradient descent to generate a globally-optimal LP-solution, solver 206 updates variables to be fixed at their upper or lower bounds. Solver 206 may then iteratively repeat solving the functional-based decomposed subproblems for each objective until solver 206 solves all objectives of the multi-objective hierarchical LP supply chain master planning problem or solver 206 detects one or more stopping criteria, as described below.

During variable fixing, solver 206 fixes particular variables to their upper or lower bounds according to a list that is updated after each objective solve. Generally, variables which can deteriorate an objective value are fixed at their lower bounds, variables which can improve an objective value are fixed at their upper bounds, and variables which are neutral remain unfixed. Upon solving the LP problem, solver 206 generates, as part of the solution data, a reduced cost of each variable. In the case of a minimization objective, when a variable has a positive reduced cost, then it will deteriorate the objective and hence be fixed to its lower bound, while a variable with a negative reduced cost will improve the objective value and hence be fixed to its upper bound.

Returning to activity 928, when supply chain solver 206 detects that the currently solved objective is the final objective, method 900 ends.

Figure 10:
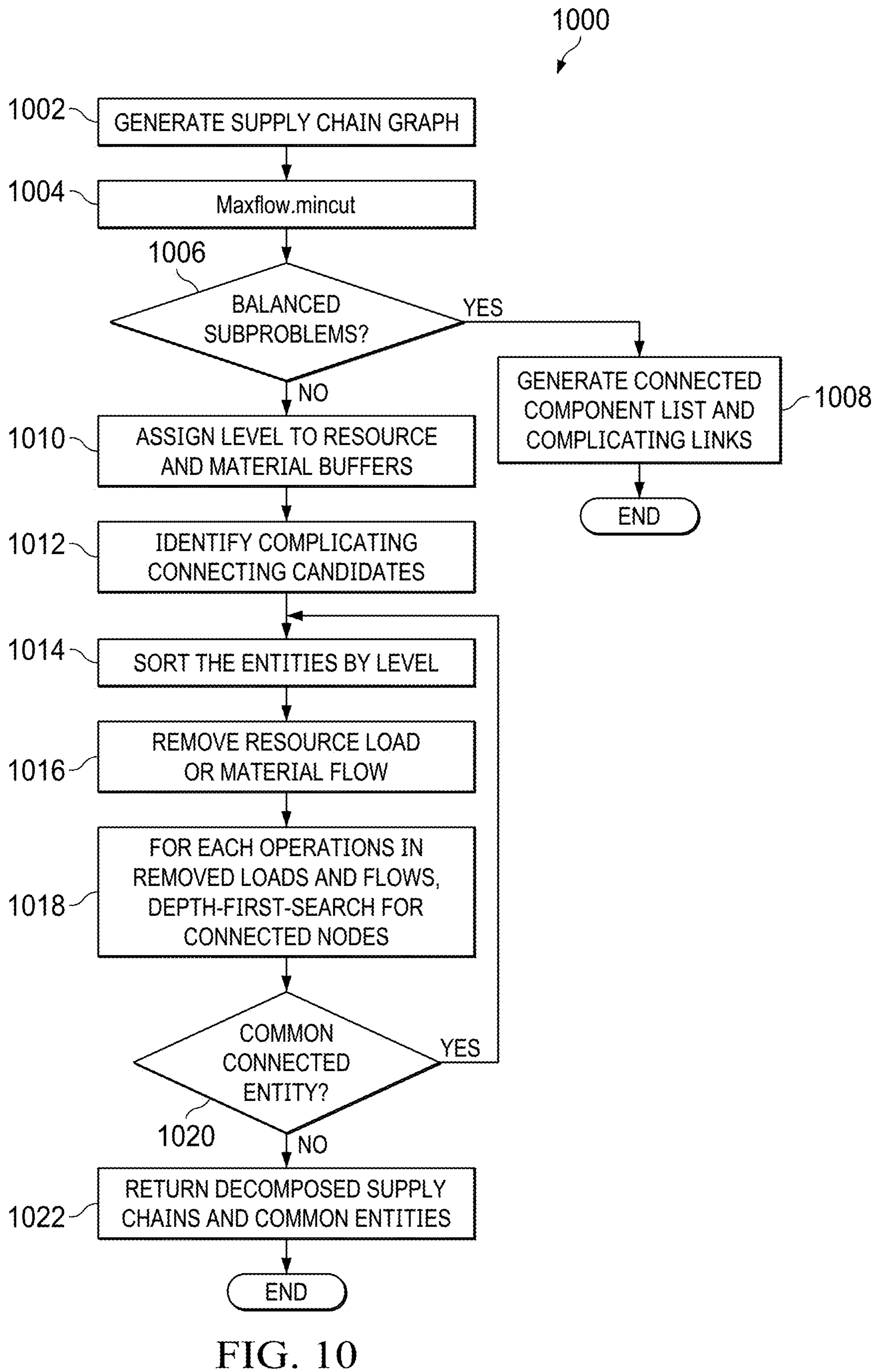
FIG. 10 illustrates a method of supply chain problem partitioning, in accordance with an embodiment.

FIG. 10 illustrates method 1000 of supply chain network partitioning, in accordance with an embodiment. Exemplary method 1000 proceeds by one or more activities, which although described in a particular order may be performed in one or more permutations, according to particular needs.

At activity 1002, modeler 202 models the supply chain network of the supply chain planning problem as a supply chain graph. As disclosed above, modeler 202 generates a supply chain graph, such as, for example, supply chain graph 700, comprising a network of nodes representing material and resource buffers and edges comprising a weight corresponding to the number of units of material or resource consumed for each unit that is processed.

At activity 1004, decomposition module 204 applies a maxflow-mincut process to supply chain graph. In one embodiment, decomposition module 204 begins the maxflow-mincut process by checking for complicating nodes. In addition, or as an alternative, when the supply chain network is determined to be convergent or divergent, the maxflow-mincut process traverses the supply chain network beginning at the most downstream nodes and moving upstream or at the most upstream nodes and moving downstream, respectively. While traversing the supply chain network, decomposition module 204 searches for complicating edges which produce balanced subproblems and minimize complicating constraints. According to one embodiment, decomposition module 204 uses depth first search (DFS) to traverse the supply chain network. According to an embodiment, decomposition module 204 uses a maxflow-mincut process to identity the minimum number of nodes that, if removed, generates decomposed and balanced subproblems.

At activity 1006, decomposition module 204 checks for balanced subproblems. When decomposition module 204 detects balanced subproblems, method 1000 continues to activity 1008, where decomposition module 204 generates connected component list and complicating links. The connected component list comprises a list of nodes in the supply chain network which are separated from the other components, and may include, for example, a list of nodes, variables, and constraints for each of the decomposed subproblems. Complicating links are edges between the nodes which, when removed, decompose the supply chain planning problem. Constraints of the complicating links may be referred to as complicating entities.

When decomposition module 204 does not detect balanced subproblems, method 1000 continues to activity 1010, where decomposition module 204 traverses the material and resource nodes of the supply chain network using a decomposition process that is customized according to the classification of the supply chain network as convergent, divergent, or generic, as stated above. According to one embodiment, decomposition module 204 assigns levels to each resource and material buffer according to their placement in the supply chain network and/or their number of connected edges.

At activity 1012, decomposition module 204 determines which of the traversed buffers has two or more consuming flows, producing flows, or loading operations.

At activity 1014, decomposition module 204 determines the complicating connecting entity having the lowest assigned level, and decomposition module 204 removes the resource load or material flow from each complicating entity, at activity 1016. At activity 1018, decomposition module 204 searches for connected entities using depth-first-search for connected nodes for each operation in each of the removed resource loads and material flows.

At activity 1020, decomposition module 204 checks for common connected entities. When decomposition module 204 detects common connected entities, method 1000 returns to activity 1014, and decomposition module 204 iteratively processes each common connected node as a complicating entity until decomposition module 204 does not detect common connected entities at activity 1020. When decomposition module 204 does not detect common connected entities, method 1000 continues to activity 1022, where decomposition module 204 provides the collected composed supply chains (comprising, for example, the connected component list and the complicating links) to modeler 202 to generate decomposed supply chain subproblems based on the identified connected components and complicating links.

As disclosed above, method 1000 is modified at activity 1010 based, at least in part, on the classification of the supply chain network as convergent, divergent, or generic.

FIG. 11A illustrates exemplary code implementing the dividing of a convergent supply chain at a complicating node, in accordance with an embodiment. When the decomposition module 204 determines the supply chain network is convergent, decomposition module 204 traverses the supply chain network from the most downstream buffers and proceeds toward the upstream buffers.

FIG. 11B illustrates exemplary code implementing the dividing of a divergent supply chain at a complicating node, in accordance with an embodiment. When the supply chain network is divergent, decomposition module 204 traverses the supply chain network from the most upstream buffers and proceeds toward the downstream buffers, searching for complicating nodes that provide for partitioning the supply chain network into balanced supply chains.

FIG. 11C illustrates exemplary code implementing the dividing of a generic supply chain at a complicating node, in accordance with an embodiment. When the supply chain network is not convergent or divergent, decomposition module 204 traverses the supply chain network according to the number of edges connecting to each of the nodes. For a generic supply chain network, decomposition module 204 proceeds from the node having the most connections to the node having the least number of connections.

Figure 12:
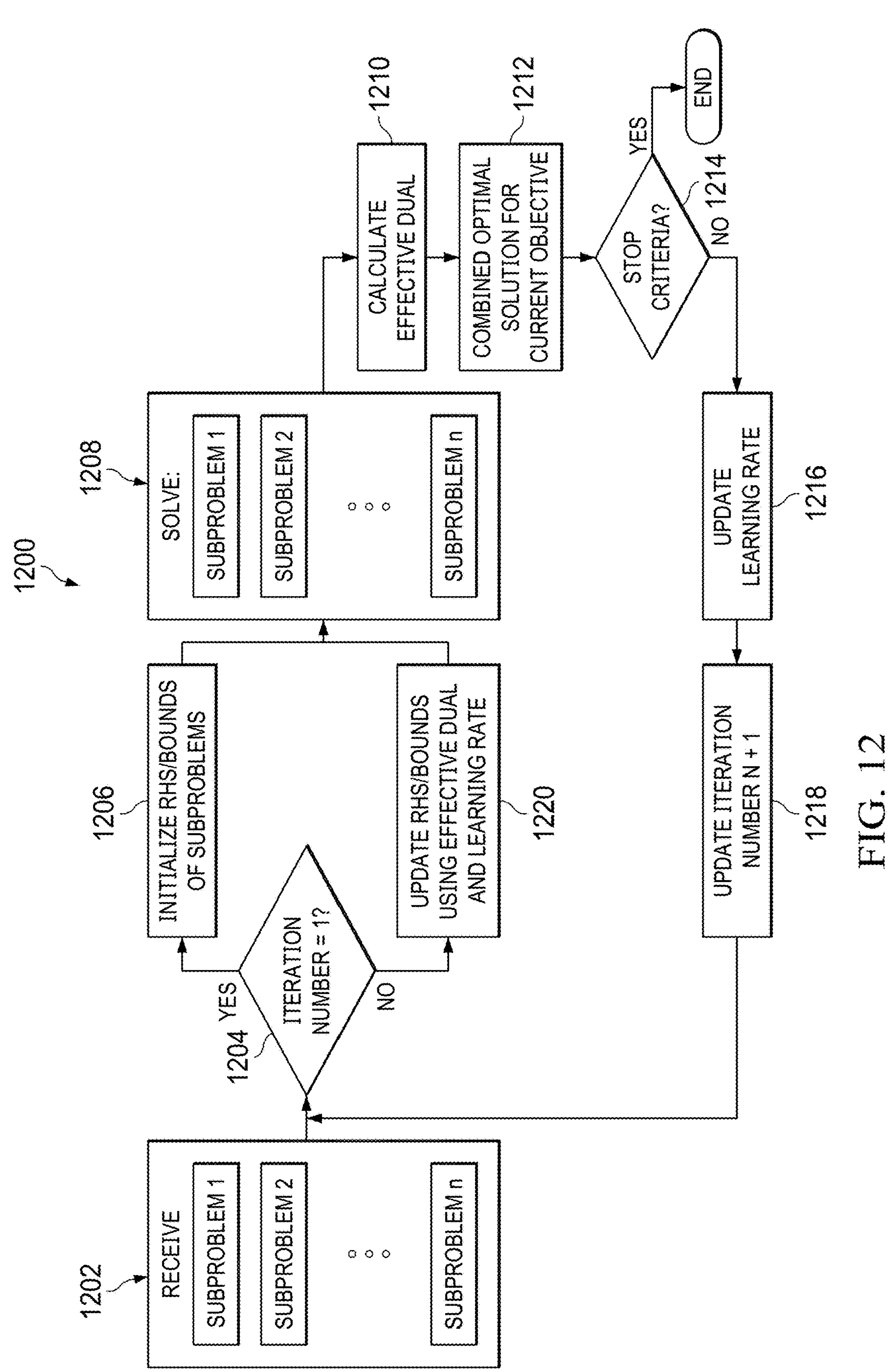
FIG. 12 illustrates a method of solving functional-based decomposed subproblems using masterless iteration, in accordance with an embodiment.

FIG. 12 illustrates method 1200 of solving functional-based decomposed subproblems using masterless iteration, in accordance with an embodiment. Exemplary method 1200 proceeds by one or more activities, which although described in a particular order may be performed in one or more permutations, according to particular needs.

As disclosed above, method 1200 of functional decomposition generates a globally-optimal LP solution to a LP supply chain master planning problem using masterless iteration with subgradient descent to solve decomposed subproblems. Although method 1200 is shown and described as generating the globally-optimal LP solution by solving functional-based decomposed subproblems using a heuristic solver and applying masterless iteration with subgradient descent, embodiments contemplate generating globally-optimal LP solution and solving functional-based decomposed subproblems using any one or more optimization or heuristic solvers, other methods of masterless iteration, and/or other subgradient methods, according to particular needs. In addition, although method 1200 is described as generating the globally-optimal LP solution, embodiments contemplate infeasible problems, wherein method 1200 stops. This infeasibility may however be translated to functional information to identify a new stopping criteria or provide additional insight into the supply chain planning problem for supply chain planner 110. Embodiments also contemplate, when the solution to the subproblems is infeasible, adding virtual variables that make the problem feasible, and, later, removing them.

Method 1200 begins at activity 1202 where solver 206 accesses functional-based decomposed subproblems (Subproblem 1, Subproblem 2 . . . . Subproblem n). As discussed above, each of functional-based decomposed subproblems comprise LP formulations of the LP supply chain master planning problem split at one or more nodes representing one or more complicating constraints and sharing the material or capacity for the one or more complicating constraints.

At activity 1204, solver 206 checks whether the current iteration is the first iteration (i.e. when the iteration number is equal to one). When the current iteration is the first iteration, solver 206 continues to activity 1206 and initializes the Right Hand Side (RHS) and/or the variable bounds of the functional-based decomposed subproblems. According to embodiments, the sum of the RHS of the functional-based decomposed subproblems equals the RHS of the master LP problem, and solver 206 allocates all of the capacity or material of the complicating constraint of the LP supply chain master planning problem to the complicating constraints of the functional-based decomposed subproblems, such that the total capacity and material allocated to functional-based decomposed subproblems equals 100% of the capacity or material of the LP supply chain master problem.

At activity 1208, solver 206 solves the functional-based decomposed subproblems. According to one embodiment, solver 206 solves the functional-based decomposed subproblems using LP optimization.

Each of the functional-based decomposed subproblems comprises its own objectives, constraints, and variables. As stated previously, complicating constraints are common to functional-based decomposed subproblems. Each of the complicating constraints is split on the RHS of the subproblems, and when solver 206 solves functional-based decomposed subproblems, a dual value is calculated for each of the constraints in functional-based decomposed subproblems.

At activity 1210, solver 206 uses the calculated duals to calculate an effective dual. According to the embodiments, the effective dual is the mathematical difference of the dual values of the complicating constraints of the functional-based decomposed subproblems. By way of example only and not of limitation, when a dual value of a first subproblem equals one hundred and a dual value of a second subproblem equals twenty-five, solver 206 calculates the effective dual as seventy-five. Although the effective dual is described as a difference of two dual values for a single complicating constraint, embodiments contemplate calculating effective duals for any number of subproblems and any number of complicating constraints, according to particular needs.

At activity 1212, solver 206 combines the solutions of each of the subproblems for the current objective. The final solution (objective values) is the sum of objective values (solutions) of each of the subproblems.

At activity 1214, solver 206 checks for one or more stopping criteria. According to an embodiment, one or more stopping criteria may comprise detecting the globally-optimal LP solution. In this embodiment, method 1200 ends when solver 206 determines that the current solution is the globally-optimal LP solution. Additionally, or in the alternative, stopping criteria may comprise one or more of a functional interpretation of supply chain data 210, infeasibility in capacity or material less than, equal to, and/or greater than a predetermined value, percentage, or other threshold. [e.g. a material is over or under consumed, or a capacity is over or under consumed.] In one embodiment, stopping criteria comprise functional interpretation of dual values. In addition, or as an alternative, stopping criteria comprise detecting a value of infeasibility and/or suboptimality for the solve exceeds a threshold while solving the functional-based decomposed subproblems. According to an embodiment, one or more thresholds are preselected tolerance for infeasibility and suboptimality which, when met or exceeded, method 1200 ends. By way of example only and not of limitation, supply chain planner 110 sets a threshold for a resource at 0.01%. When solver 206 determines a solution utilizes the resource ±1% of the actual availability and finds a converging point, solver 206 stops correcting the 1% infeasibility. According to embodiments, the infeasibility tolerance comprises a threshold value for one or more material flows. In addition or as an alternative, stopping criteria comprise a suboptimality tolerance that sets a minimum difference between the objective value of iterative solutions. For example, when solver 206 detects that a difference between a number of previous consecutive iterations of the objective value (such as, for example, five iterations) is less than a preselected suboptimality threshold, solver 206 ends the solve. Although the stopping criteria are described as particular values of infeasibility and suboptimality thresholds, embodiments contemplate the infeasibility and suboptimality tolerances comprising any threshold, according to particular needs.

According to an embodiment, decomposition module 204 decomposes a supply chain planning problem that is formulated as one or more LP matrices using functional decomposition. In this exemplary embodiment, decomposition module 204 decomposes the supply chain planning problem into two or more submatrices. Solver 206 solves the subproblems represented by the two or more submatrices using a CPLEX solver and according to a combined objective. Solver 206 checks for one or more stopping criteria. When the one or more stopping criteria are not detected, method 1200 continues the masterless iteration with subgradient descent to generate two or more new supply chain planning problems represented by the two or more submatrices.

At activity 1216, solver 206 updates the learning rate. According to an embodiment, solver 206 updates the learning rate during each iteration by dividing the previous learning rate by a factor calculated as the square root of the current iteration number. For the first iteration, the learning rate does not change because the factor for the first iteration is equal to one (i.e. the square root of one is one). At a second iteration, the learning rate may be calculated by dividing the learning rate of the first iteration by the square root of two. Similarly, for the third iteration, the learning rate may be calculated by dividing the learning rate of the second iteration by the square root of three; the fourth iteration's learning rate is the learning rate of the third iteration divided by two (i.e. the square root of four); and so on.

After increasing the iteration counter by one at activity 1218, method 1200 returns to activity 1204, where solver 206 again evaluates the current iteration number. The current iteration is the second iteration, iteration number is equal to two, and method 1200 continues to activity 1220, where solver 206 updates the RHS bounds using the current effective dual and learning rate. As stated above, modeler 202 initializes the RHS of the functional-based decomposed subproblems so that the sum of the RHS of the functional-based decomposed subproblems is equal to the RHS of the master LP problem. According to one embodiment, solver 206 updates the RHS of the complicating constraints, iteratively, and tries to find the best assignment using dual values, to achieve the optimum solution. Solver 206 may iteratively loop through the masterless iteration method for each hierarchical objective level and fixing variables to upper and lower bounds until detecting one or more other stopping criteria, such as, for example, determining that the current solution is the globally-optimal LP solution, as disclosed above.

Because the functional decomposition method provides for speeding up the run time for generating globally-optimal LP solutions to supply chain master planning problems, batch runs (e.g., daily, weekly, and the like) may be performed in less time, and changes in customer data may be addressed sooner (e.g., an intraday rerun of optimization based on changes in data).

Figure 13A:
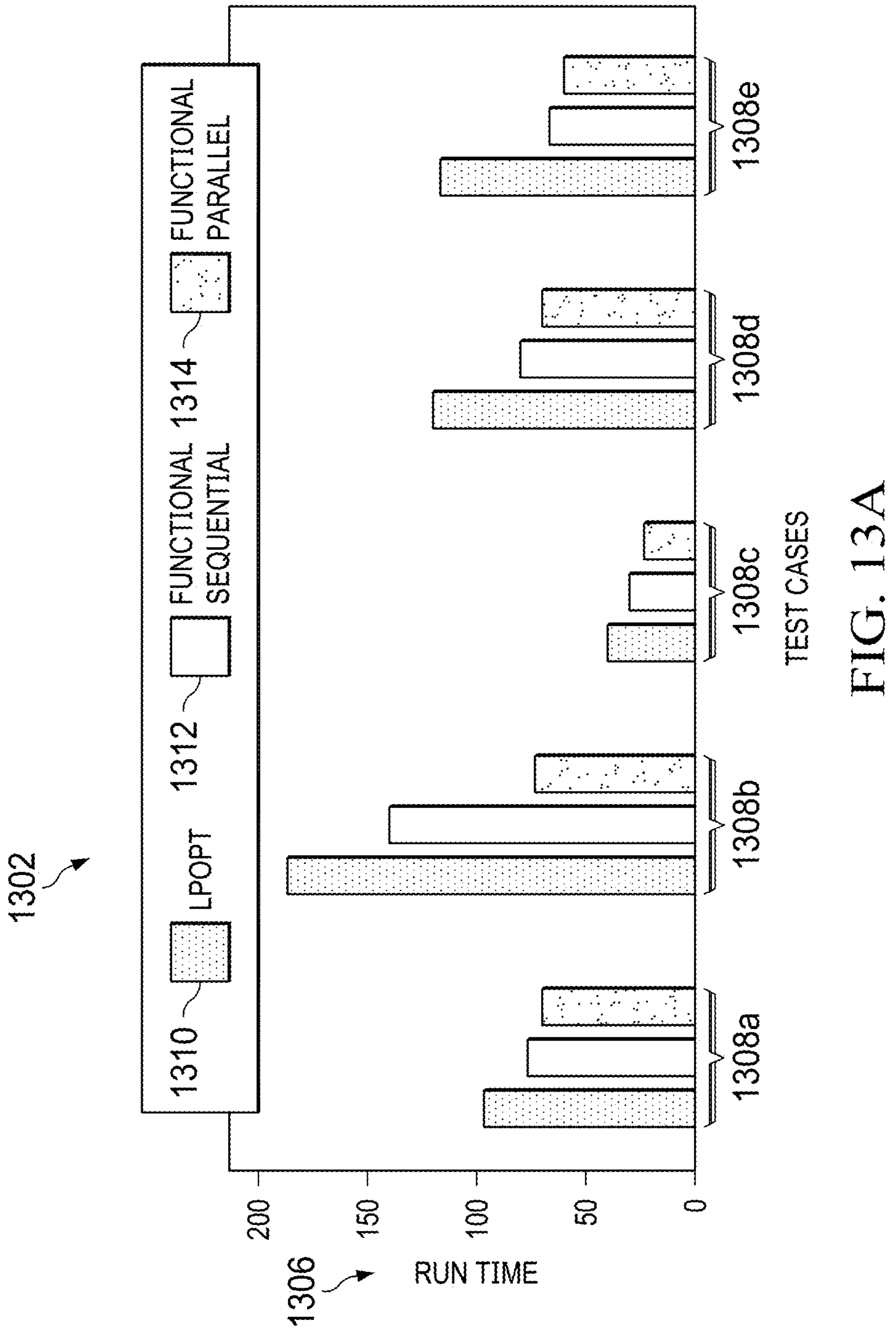

FIGS. 13A-13B illustrate chart 1302 and table 1304 comparing run time of an LP optimization method (LPOPT) and functional decomposition method 900, according to an embodiment. Chart 1302 illustrates run time 1306 for five test cases 1308*a*-1308*e* for three solving methods: LPOPT 1310; functional decomposition method 900 solving the subproblems sequentially (Functional Sequential) 1312; and functional decomposition method 900 solving the subproblems in parallel (Functional Parallel) 1314. Functional decomposition method 900 generates the same optimal solution for the highest objective level and deviates from a perfectly optimal solution on lower objectives by less than one percent, which is negligible. Results for test cases 1308*a*-1308*e* comprise Number of Complicating Constraints/Total Constraints 1320, run time 1322 for LPOPT 1310, run times 1324 for Functional Sequential 1312, run times 1326 for Functional Parallel, percentage 1328 of runtime (Functional Sequential 1312/LPOPT 1310), and percentage 1330 of runtime (Functional Parallel 1314/LPOPT 1310). Run times 1324 for Functional Sequential 1312 (78 s.; 141 s.; 30 s.; 79.81 s.; 69 s.) and run times 1326 for Functional Parallel 1314 (70 s.; 73 s.; 25.53 s.; 70 s.; 59.9 s.) are significantly improved over run times 1322 for LPOPT 1310 (98 s.; 185.63 s.; 40.65 s.; 101.28 s.; 127 s.), and Functional Parallel 1314 was the fastest overall. Test sets 1308*a*-1308*e* validate the performance benefit for using functional-based decomposition method 900 over LPOPT 1310, providing speed improvements between 28.57% and 60.67%.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for supply chain network partitioning, comprising:

a computer, comprising a processor and memory, the computer configured to:

model the supply chain network as a graph;

traverse the graph to apply a maxflow-mincut process to the graph;

in response to detecting that one or more subproblems are balanced, generate a first connected components list and one or more first complicating links;

in response to detecting that the one or more subproblems are not balanced, partition the supply chain network by:

applying a decomposition process according to a classification of the supply chain network;

assigning one or more levels to each resource and material buffer according to corresponding placement in the supply chain network;

determining which of one or more buffers has two or more flows or operations;

determining a complicating connecting entity having a lowest assigned level, and removing a resource load or material flow from each complicating entity;

searching for one or more connected entities using a depth-first-search for one or more connected nodes for each operation in each of the removed resource loads and the removed material flows;

iteratively processing each common connected node as a complicating entity; and providing a second connected component list and one or more second complicating links of the supply chain network; and generate one or more decomposed supply chain subproblems for solving, by the computer, the one or more decomposed supply chain subproblems using masterless iteration with subgradient descent to generate a globally-optimal linear-programming solution for the supply chain network, and causing at least one automated supply-chain operation comprising production, transportation, or inventory movement according to the globally-optimal linear-programming solution.

2. The system of claim 1, wherein the supply chain network comprises nodes representing one or more buffers and one or more edges, wherein each edge comprises a weight corresponding to a number of units consumed.

3. The system of claim 1, wherein the classification of the supply chain network comprises one of: convergent and divergent.

4. The system of claim 1, wherein the second connected component list comprises a list of nodes which are separated from one or more other components.

5. The system of claim 1, wherein the maxflow-mincut process is applied beginning at downstream nodes for a convergent supply chain network, and wherein the maxflow-mincut process is applied beginning at upstream nodes for a divergent supply chain network.

6. The system of claim 1, wherein the second connected components list comprises a list of one or more nodes, one or more variables and one or more constraints for each of the one or more decomposed supply chain subproblems.

7. The system of claim 1, wherein the maxflow-mincut process identifies a number of removed nodes which generate decomposed and balanced subproblems.

8. A computer-implemented method for supply chain network partitioning, comprising:

modelling, by a computer comprising a processor and a memory, the supply chain network as a graph;

traversing, by the computer, the graph to apply a maxflow-mincut process to the graph;

in response to detecting that one or more subproblems are balanced, generating, by the computer, a first connected components list and one or more first complicating links;

in response to detecting that the one or more subproblems are not balanced, partitioning, by the computer, the supply chain network by:

applying, by the computer, a decomposition process according to a classification of the supply chain network;

assigning, by the computer, one or more levels to each resource and material buffer according to corresponding placement in the supply chain network;

determining, by the computer, which of one or more buffers has two or more flows or operations;

determining, by the computer, a complicating connecting entity having a lowest assigned level, and removing a resource load or material flow from each complicating entity;

searching, by the computer, for one or more connected entities using a depth-first-search for one or more connected nodes for each operation in each of the removed resource loads and the removed material flows;

iteratively processing, by the computer, each common connected node as a complicating entity; and providing, by the computer, a second connected component list and one or more second complicating links of the supply chain network; and generating, by the computer, one or more decomposed supply chain subproblems for solving, by the computer, the one or more decomposed supply chain subproblems using masterless iteration with subgradient descent to generate a globally-optimal linear-programming solution for the supply chain network, and causing at least one automated supply-chain operation comprising production, transportation, or inventory movement according to the globally-optimal linear-programming solution.

9. The computer-implemented method of claim 8, wherein the supply chain network comprises nodes representing one or more buffers and one or more edges, wherein each edge comprises a weight corresponding to a number of units consumed.

10. The computer-implemented method of claim 8, wherein the classification of the supply chain network comprises one of: convergent and divergent.

11. The computer-implemented method of claim 8, wherein the second connected component list comprises a list of nodes which are separated from one or more other components.

12. The computer-implemented method of claim 8, wherein the maxflow-mincut process is applied beginning at downstream nodes for a convergent supply chain network, and wherein the maxflow-mincut process is applied beginning at upstream nodes for a divergent supply chain network.

13. The computer-implemented method of claim 8, wherein the second connected components list comprises a list of one or more nodes, one or more variables and one or more constraints for each of the one or more decomposed supply chain subproblems.

14. The computer-implemented method of claim 8, wherein the maxflow-mincut process identifies a number of removed nodes which generate decomposed and balanced subproblems.

15. A non-transitory computer-readable storage medium embodied with software for supply chain network partitioning, the software when executed:

models the supply chain network as a graph;

traverses the graph to apply a maxflow-mincut process to the graph;

in response to detecting that one or more subproblems are balanced, generates a first connected components list and one or more first complicating links;

in response to detecting that the one or more subproblems are not balanced, partitions the supply chain network by:

applying a decomposition process according to a classification of the supply chain network;

assigning one or more levels to each resource and material buffer according to corresponding placement in the supply chain network;

determining which of one or more buffers has two or more flows or operations;

determining a complicating connecting entity having a lowest assigned level, and removing a resource load or material flow from each complicating entity;

searching for one or more connected entities using a depth-first-search for one or more connected nodes for each operation in each of the removed resource loads and the removed material flows;

iteratively processing each common connected node as a complicating entity; and providing a second connected component list and one or more second complicating links of the supply chain network; and generates one or more decomposed supply chain subproblems for solving the one or more decomposed supply chain subproblems using masterless iteration with subgradient descent to generate a globally-optimal linear-programming solution for the supply chain network, and causing at least one automated supply-chain operation comprising production, transportation, or inventory movement according to the globally-optimal linear-programming solution.

16. The non-transitory computer-readable storage medium of claim 15, wherein the supply chain network comprises nodes representing one or more buffers and one or more edges, wherein each edge comprises a weight corresponding to a number of units consumed.

17. The non-transitory computer-readable storage medium of claim 15, wherein the classification of the supply chain network comprises one of: convergent and divergent.

18. The non-transitory computer-readable storage medium of claim 15, wherein the second connected component list comprises a list of nodes which are separated from one or more other components.

19. The non-transitory computer-readable storage medium of claim 15, wherein the maxflow-mincut process is applied beginning at downstream nodes for a convergent supply chain network, and wherein the maxflow-mincut process is applied beginning at upstream nodes for a divergent supply chain network.

20. The non-transitory computer-readable storage medium of claim 15, wherein the second connected components list comprises a list of one or more nodes, one or more variables and one or more constraints for each of the one or more decomposed supply chain subproblems.

* * * * *